(12) United States Patent
Noguchi et al.

(10) Patent No.: US 7,479,985 B2
(45) Date of Patent: Jan. 20, 2009

(54) VARIABLE MAGNIFICATION LENS HAVING IMAGE STABILIZING FUNCTION

(75) Inventors: Kazuhiro Noguchi, Utsunomiya (JP); Tadanori Okada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 11/276,690

(22) Filed: Mar. 10, 2006

(65) Prior Publication Data

US 2006/0152806 A1    Jul. 13, 2006

Related U.S. Application Data

(63) Continuation of application No. 09/844,274, filed on Apr. 30, 2001, now abandoned, which is a continuation-in-part of application No. 09/263,078, filed on Mar. 8, 1999, now abandoned.

(30) Foreign Application Priority Data

Mar. 12, 1998  (JP) ................. 10-080208
Feb. 12, 1999  (JP) ................. 11-033925

(51) Int. Cl.
*H04N 5/228*  (2006.01)
*H04N 5/238*  (2006.01)

(52) U.S. Cl. ............ 348/208.5; 348/208.6; 348/208.11; 348/208.12; 348/363

(58) Field of Classification Search ............. 348/208.5, 348/208.6, 208.11, 208.12, 363
See application file for complete search history.

(56) References Cited

U.S. PATENT DOCUMENTS

| | | | |
|---|---|---|---|
| 3,918,798 A | 11/1975 | Takano | 359/683 |
| 3,955,208 A | 5/1976 | Wick et al. | 396/506 |
| 4,599,657 A | 7/1986 | Kaji et al. | 386/117 |
| 4,686,572 A | 8/1987 | Takatsu | 348/298 |
| 4,705,363 A | 11/1987 | Ikemori | 350/427 |
| 4,907,868 A | 3/1990 | Kitagishi et al. | 350/463 |
| 4,998,809 A | 3/1991 | Tsuji et al. | 350/500 |
| 5,060,074 A * | 10/1991 | Kinugasa et al. | 348/208.6 |
| 5,264,966 A | 11/1993 | Okada et al. | 359/696 |

(Continued)

FOREIGN PATENT DOCUMENTS

JP    1-134420    5/1989

(Continued)

OTHER PUBLICATIONS

Dec. 2, 2005 Japanese Official Action in Japanese Patent Application No. 10-80208 (with English-language translation).

(Continued)

*Primary Examiner*—James M Hannett
(74) *Attorney, Agent, or Firm*—Fitzpatrick, Cella, Harper & Scinto

(57) ABSTRACT

An image stabilizer for stabilizing an image against unexpected vibrations or shaking of a zoom lens includes a diaphragm arranged to vary its full-open-aperture diameter according to a magnification varying (zooming) action from a wide-angle end position to a telephoto end position of the zoom lens for the purpose of preventing variations in light quantity which more conspicuously take place in the peripheral part than in the central part of an image plane when an image stabilizing action is performed.

6 Claims, 20 Drawing Sheets

U.S. PATENT DOCUMENTS

| | | | | |
|---|---|---|---|---|
| 5,278,605 | A | 1/1994 | Satoh | 354/446 |
| 5,311,238 | A | 5/1994 | Karasawa et al. | 396/78 |
| 5,396,286 | A | 3/1995 | Ishizuka | 348/208.6 |
| 5,479,236 | A | 12/1995 | Tanaka | 354/430 |
| 5,513,042 | A | 4/1996 | Itoh et al. | 359/674 |
| 5,576,890 | A | 11/1996 | Tanaka et al. | 359/686 |
| 5,581,404 | A | 12/1996 | Misaka et al. | 359/557 |
| 5,604,560 | A | 2/1997 | Kaneda | 396/133 |
| 5,731,897 | A | 3/1998 | Suzuki | 359/557 |
| 5,774,754 | A | 6/1998 | Ootsuka | 396/380 |
| 5,790,316 | A | 8/1998 | Terasawa et al. | 359/687 |
| 5,809,353 | A | 9/1998 | Hirano | 396/55 |
| 5,845,157 | A | 12/1998 | Imura et al. | 396/55 |
| 5,847,875 | A | 12/1998 | Kodama et al. | 359/676 |
| 5,894,325 | A | 4/1999 | Yonemoto | 348/302 |
| 5,913,081 | A * | 6/1999 | Okano et al. | 396/55 |
| 6,225,614 | B1 * | 5/2001 | Ono | 250/201.5 |

FOREIGN PATENT DOCUMENTS

| | | |
|---|---|---|
| JP | 4-20941 | 1/1992 |
| JP | 6-202185 | 7/1994 |
| JP | 7-294814 | 11/1995 |
| JP | 8-82741 | 3/1996 |
| JP | 9-15502 | 1/1997 |
| JP | 9-222628 | 8/1997 |
| JP | 9-281545 | 10/1997 |
| JP | 2000-69359 | 3/2000 |

OTHER PUBLICATIONS

Sep. 2, 2003 Communication in EP 99 104 874.5.

European Official Action dated May 21, 2004, in European Appln. No. 99104874.5.

European Official Action dated Dec. 13, 2004, in European Appln. No. 99104874.5.

Tamron SP 300 2.8 LD-IF from www.photo.net (Product ID 3476).

* cited by examiner

CENTER OF IMAGE PLANE

CENTER OF IMAGE PLANE

CENTER OF IMAGE PLANE

CENTER OF CCD

PERIPHERAL LIGHT QUANTITY ON
TELEPHOTO SIDE
(WITHOUT SECOND DIAPHRAGM MEANS)

PERIPHERAL LIGHT QUANTITY ON
TELEPHOTO SIDE
(WITH SECOND DIAPHRAGM MEANS)

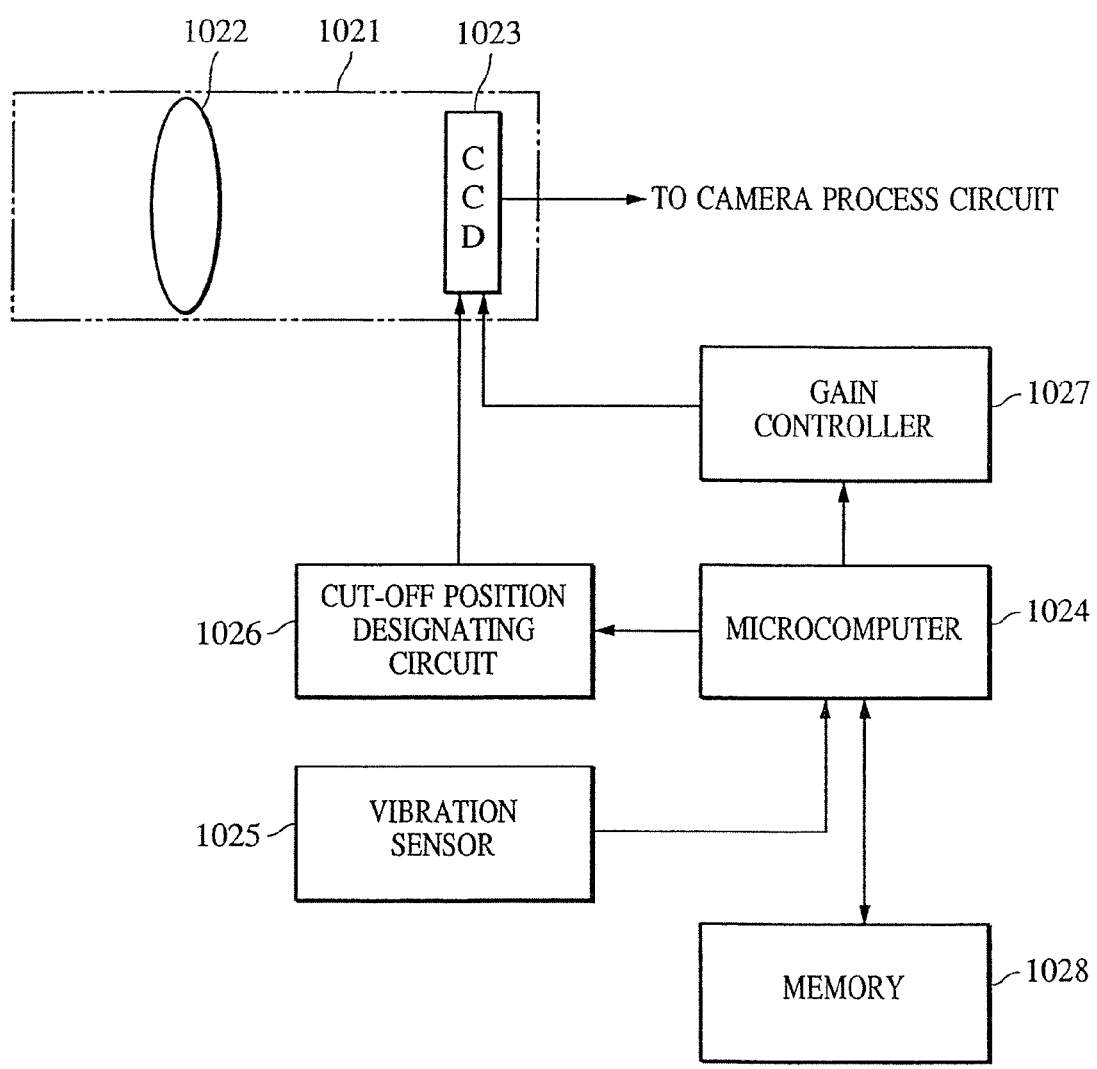

VARIABLE MAGNIFICATION LENS HAVING IMAGE STABILIZING FUNCTION

This application is a continuation of application Ser. No. 09/844,274 filed Apr. 30, 2001 now abandoned, which is a continuation-in-part of application Ser. No. 09/263,078 filed Mar. 8, 1999, now abandoned.

BACKGROUND OF THE INVENTION

1. Field of the Invention

The present invention relates to an optical apparatus having a function of correcting image shakes caused by changes of relative angles of an object to be photographed and the optical apparatus.

2. Description of Related Art

Optical apparatuses of the kind arranged to be capable of correcting image shakes have heretofore been developed in varied manners. FIG. 7 shows an example of such optical apparatuses. In the case of the optical apparatus shown in FIG. 7, the so-called variable angle prism 100 is arranged in front of an optical system composed of lens units 101 to 104 and a diaphragm 105 to correct the image shakes before a light flux P from an object comes to be incident on the optical system. Referring to FIG. 7, the lens units 101 to 104 and the diaphragm 105 are supported by a fixed tube 105. An image sensor 107 is arranged to convert into an electrical signal an optical image formed on a focal plane which is located in rear of the fixed tube 106.

In the above optical apparatus, however, the variable angle prism 100 is disposed in a place where the width of the light flux P passing through the optical system becomes widest. Therefore, the arrangement for having the variable angle prism 100 in that position is disadvantageous in respect of reduction in size of the optical apparatus.

In view of the above problem, some of known optical apparatuses have been developed to permit reduction in size. For example, an optical apparatus is arranged to have the variable angle prism disposed between two lens units within an optical system composed of a plurality of lens units. Another optical apparatus which is of the type called a lens shift type is arranged to correct the image shakes by moving some of a plurality of lens units in a direction perpendicular to an optical axis. Some other optical apparatus has been developed to have an electronic image-shake correcting function called an electronic image stabilizing device which corrects image shakes in the following manner. A CCD which has a larger area than an actually necessary area as an image sensor (thus requiring use of a large optical system having an image circle covering the whole surface of the CCD) is arranged to correct image shakes by varying the reading position thereof according to information on image shakes detected.

With the conventional optical apparatus arranged as described above, for example, in an optical system composed of lens units 111 to 114 having positive, negative, positive and positive refractive powers, respectively, and a diaphragm 115, as shown in FIG. 8, while an on-axial light flux "a" passes the center of the optical system, the upper and lower parts of an off-axial light flux "b" are blocked by the effective diameters, indicated by arrows A and B, of the lens units 111 and 114. Therefore, the thickness of the light flux becomes smaller accordingly as the incident angle of the light flux is larger (corresponding to the periphery of an image plane). As a result, an image formed by the light flux on an image forming plane 116 rapidly becomes darker in its peripheral part. The peripheral light quantity of the light flux is thus decreased by the so-called vignetting phenomenon.

In the case of the above-stated function of optically correcting image-shakes by deflecting a light flux within the optical system, if the optical apparatus is arranged to correct the image shakes in such a way as to have an object image not moving on the image forming plane at the time of a change of relative angles of the object and the optical apparatus, the vignetting degree of the light flux at each point of an object image on the image forming plane would vary to change the light quantity distribution of the object image, as the relative angles of the object and the optical apparatus have changed.

Such a state is explained with reference to FIG. 9. In FIG. 9, image forming positions are shown on the abscissa axis and the luminance of the image is shown on the ordinate axis. A one-dot-chain line shown in FIG. 9 represents the initial distribution of light quantity obtained before the relative angles of the object and the optical apparatus change. Full lines "a" and "b" shown in FIG. 9 represent light quantity distributions obtained with image shakes corrected when the relative angles change, for example, alternately to the right and to the left. When image shakes which actually take place continuously are corrected in this manner, although the object image is corrected to be not moving on an image plane, the image shake correction results in variations of luminance of the picture taking place in synchronism with the image shakes. The luminance variations become salient particularly in the peripheral part of the image plane. As a result, the quality of an image thus obtained degrades to an unacceptable degree.

Further, the electronic image shake correcting function also has a problem similar to that of the optical image shake correcting function. In this case, the light quantity distribution on the image forming plane does not change, since the relation between the image forming plane 116 and the optical system which is composed of the lens units 111 to 114 and the diaphragm 115 as shown in FIG. 8 is unchanging. However, when the object image is caused to move by the change of relative angles of the object and the optical apparatus, the reading position also changes following the movement of the object image, for example, as indicated by reading positions I and II in FIG. 10. The change of the reading position then brings about the same phenomenon as in the case of the optical image shake correcting function.

BRIEF SUMMARY OF THE INVENTION

The invention is directed to the solution of the prior art described above. It is, therefore, an object of the invention to provide an optical apparatus arranged to be capable of giving an easily viewable-image of high quality by alleviating luminance variations which occur in the peripheral parts of an image plane in correcting image shakes and by lessening a luminance difference between central and peripheral parts of the image plane, particularly at a part in the neighborhood of a telephoto end position where the variations of luminance become conspicuous.

To attain the above object, an optical apparatus according to the invention is arranged to have the following features.

(1) The full-open aperture diameter of a diaphragm provided for control over the quantity of a light flux passing through a variable magnification optical system having an image shake correcting function is limited according to the focal length.

(2) An on-axial light flux in the neighborhood of the telephoto end position of the variable magnification optical system which takes therein an off-axial light flux as well and the on-axial light flux is limited by a diaphragm.

(3) The on-axial light flux is limited by an auxiliary diaphragm which is disposed close to a main diaphragm arranged to determine an F-number.

(4) The amount of shift of a lens unit to be shifted in a direction perpendicular to an optical axis is corrected according to information on the position of the variable magnification optical system in such a way as to cancel a movement of an image caused by a tilt of the variable magnification optical system by the shift of the lens unit.

The above and other objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 24 is an illustration of a light-quantity control device in a further different embodiment of the present invention.

DETAILED DESCRIPTION OF THE INVENTION

Hereinafter, preferred embodiments of the invention will be described in detail with reference to the drawings.

Figure 1:
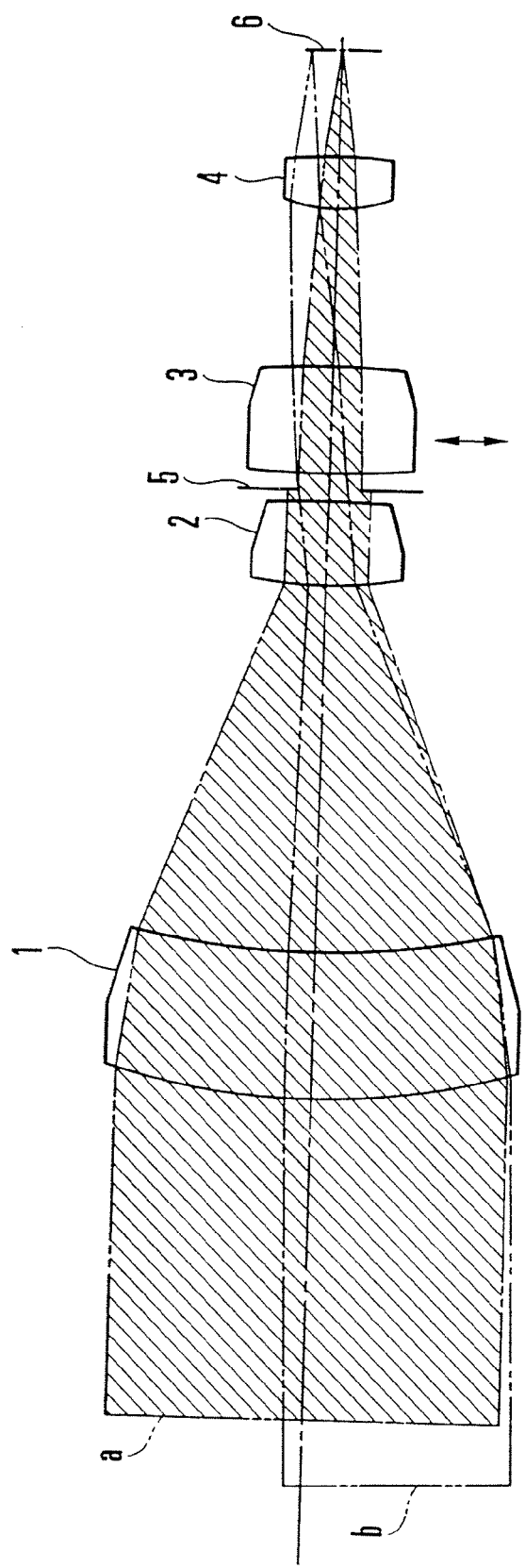
FIG. 1 shows a state obtained at a telephoto end position of a variable magnification optical system of an optical apparatus according to a first embodiment of the invention.
Figure 2:
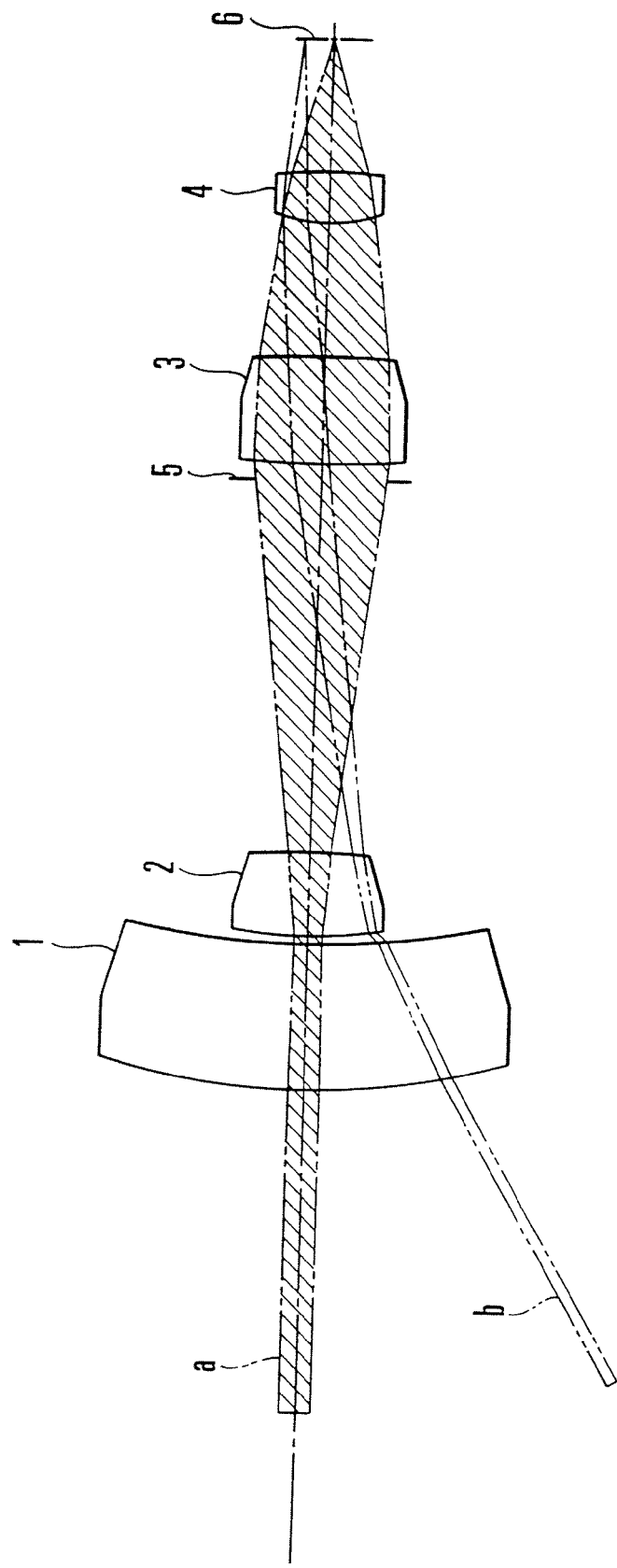
FIG. 2 shows a state obtained at a wide-angle end position of the variable magnification optical system of the optical apparatus according to the first embodiment of the invention.

FIGS. 1 and 2 show a variable magnification optical system having an image shake correcting function according to a first embodiment of the invention. The variable magnification optical system is composed of lens units 1 to 4 having positive, negative, positive and positive refracting powers, respectively. In FIG. 1, the variable magnification optical system is shown as in a state obtained with the optical system at a telephoto end position. FIG. 2 shows the variable magnification optical system as in a state obtained with the optical system at a wide-angle end position. The lens unit 1 is a fixed lens unit. The lens unit 2 is a variator lens unit which is provided for varying the magnification of the optical system by moving backward and forward. The lens unit 3 is an image-shake correcting lens unit which is arranged to deflect a light flux by moving (shifting) in a direction perpendicular to an optical axis. The lens unit 4 is a focusing lens unit provided for adjusting focus of the variable magnification optical system by moving backward and forward. A diaphragm 5 is provided for limiting the quantity of a light flux passing through the optical system. A focal plane 6 is arranged to form thereon an image of a photo-taking object.

In FIGS. 1 and 2, reference symbols "a" and "b" respectively denote an on-axial light flux obtained in the central part of an image plane and an off-axial light flux obtained in the outermost part of the image plane, i.e., a peripheral part of the image plane. Referring to FIG. 1, which shows the optical system in a state in which the diaphragm 5 is fully opened at the telephoto end position, the on-axial light flux "a" passing the lens unit 1 has its peripheral part greatly blocked by the diaphragm 5. On the other hand, the off-axial light flux "b" reaches the focal plane 6 without being blocked by the diaphragm 5. Further details of this state are as follows.

Figure 3:
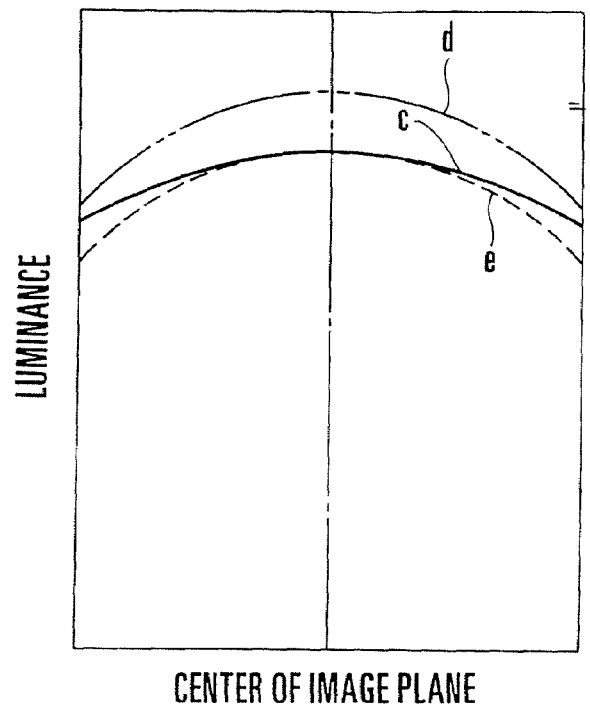
FIG. 3 is a graph for explaining a light quantity distribution in the optical apparatus according to the first embodiment.
Figure 4:
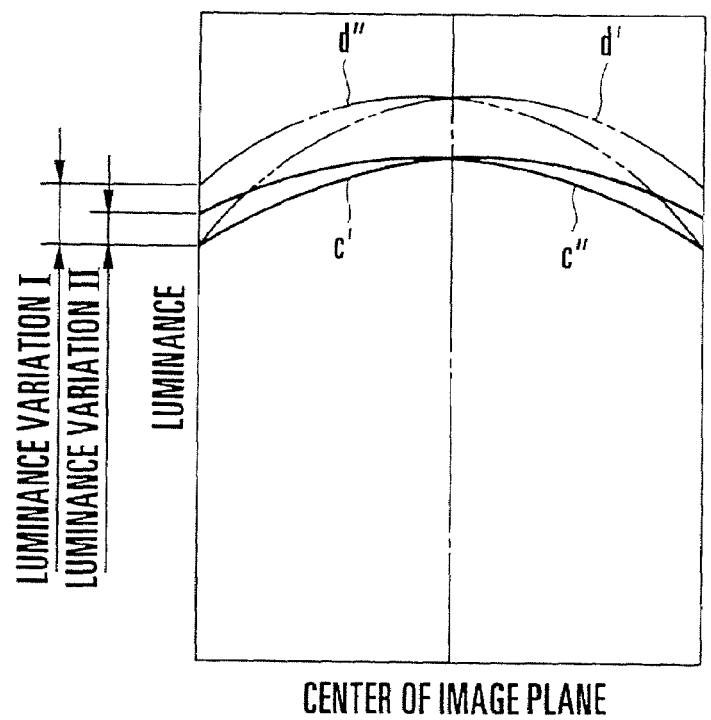
FIG. 4 is a graph for explaining the variation of the light quantity distribution in the optical apparatus according to the first embodiment of the invention.

In FIG. 3, the image forming positions are shown on the abscissa axis and the luminance of the image is shown on the ordinate axis. A full line "c" represents a light quantity distribution obtained on the focal plane 6 shown in FIG. 1. A two-dot-chain line "d" represents a light quantity distribution obtained when the diaphragm 5 is opened to a position where it does not block the on-axial light flux "a". A broken line "e" represents a light quantity distribution obtained when the diameter of the lens unit 1 is reduced to a size at which only such a portion of the on-axial light flux that can pass through the full-open aperture of the diaphragm as shown in FIG. 1 is allowed to pass. In other words, with the lens unit 1 arranged to have a large diameter to receive the on-and off-axial light fluxes in large quantity, at least the on-axial light flux is made to be limited by the diaphragm 5. This arrangement is made such that a difference in luminance between the central and peripheral parts of the image plane is lessened. FIG. 4 shows variations of light quantity distribution taking place with the image shake correction actually performed. Lines or curves c', c", d' and d" show the variations of light quantity distribution obtained with the diaphragm 5 at its positions where the lines "c" and "d" are obtained, respectively. FIG. 4 clearly shows that the variations taking place in the peripheral part of the image plane, in particular, is greatly improved by limiting the full-open aperture diameter of the diaphragm 5, as indicated by variations I and II of luminance.

Figure 5:
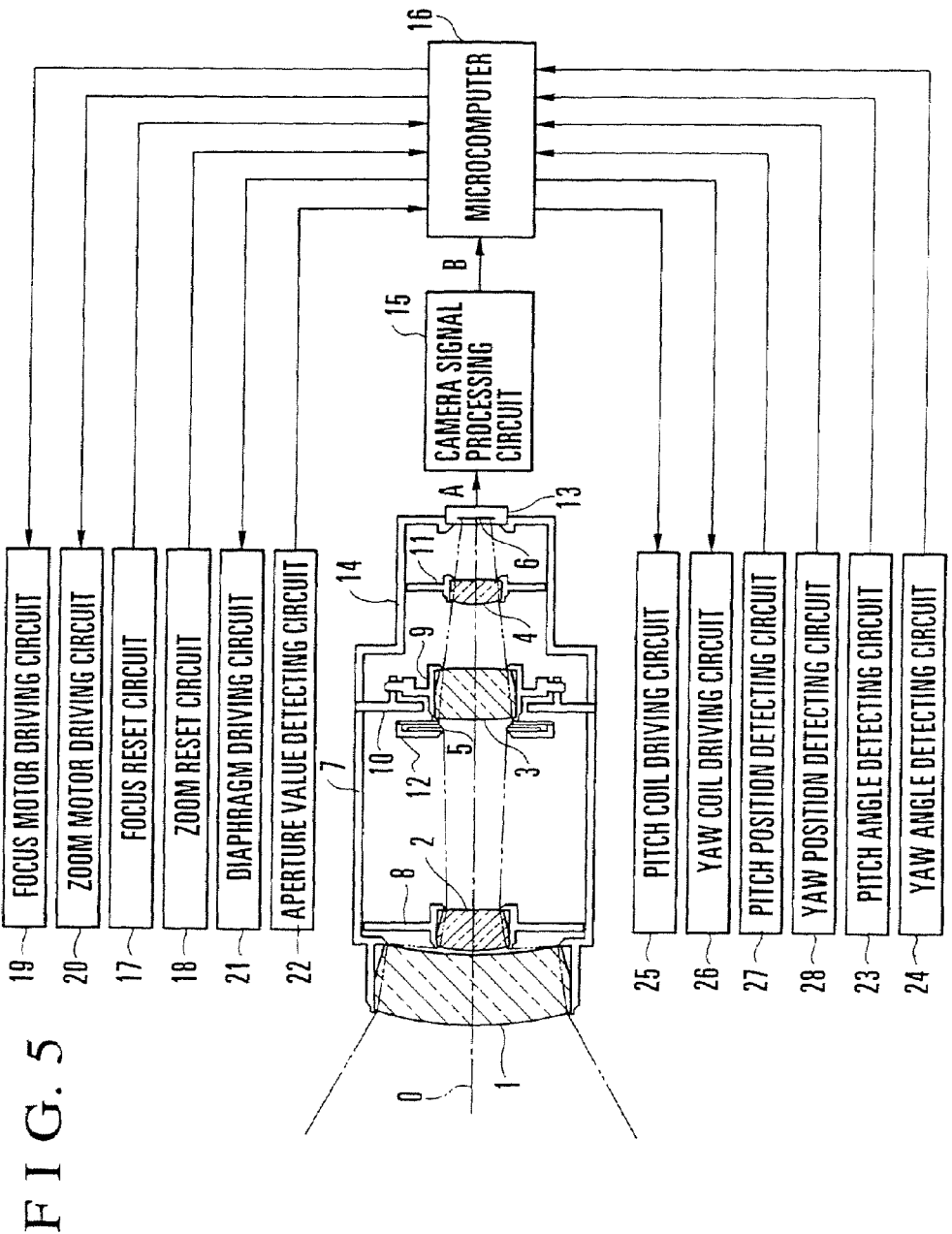
FIG. 5 schematically shows the arrangement of an optical apparatus having an image shake correcting function according to the invention.

FIG. 5 shows in outline the arrangement of the optical apparatus having the image shake correcting function. For the lens units 1 to 4, the diaphragm 5 and the focal plane 6 shown in FIG. 1, the following parts are provided as shown in FIG. 5. A fixed tube 7 is arranged to hold the lens unit 1. A moving frame 8 is arranged to hold the lens unit 2 in a known bar-sleeve structure to be movable in the direction of the optical axis by a stepping motor through a known mechanism including a rack and a feed screw.

A shift frame 9 is arranged to hold the lens unit 3 and to be movable in a direction perpendicular to the optical axis O by a guide mechanism (not shown) which is arranged between a holding frame 10 and the shift frame 9. The position of the shift frame 9 is arranged to be determined in the directions of pitch and yaw by a driving means and a position detecting means which are not shown.

A moving frame 11 is arranged to hold the lens unit 4 in a known bar-sleeve structure to be movable in the direction of the optical axis by a stepping motor through a known mechanism including a rack and a feed screw. A known diaphragm device 12 is arranged to support and drive the diaphragm 5. The diaphragm device 12 is preferably a so-called iris diaphragm which has a plurality of sickle-shaped diaphragm blades arranged in a circumferential direction so as to form an approximately circular aperture by rotating the plurality of diaphragm blades at the same time.

An image sensor 13 is a CCD which is arranged on the focal plane 6 to convert an optical image into an electrical signal. A fixed frame 14 is arranged to hold the CCD 13 and other moving mechanisms. An electrical signal A read out from the CCD 13 is processed into a video signal by a camera signal processing circuit 15.

A microcomputer 16 is arranged to control lens driving actions. When a power supply is switched on, the microcomputer 16 causes a focus motor driving circuit 19 and a zoom motor driving circuit 20 to rotate their respective stepping motors for moving the moving frames 11 and 8 while continuously monitoring the output of a focus reset circuit 17 and that of a zoom reset circuit 18. The output of the focus reset circuit 17 and that of the zoom reset circuit 18 are inverted respectively when each of the moving frames 11 and 8 comes to a predetermined position, where light from a light emitting part of a photo-interrupter disposed at a fixed part is blocked, or allowed to pass at a boundary part, by a light blocking part of each moving frame. After that, with this position used as a datum position, the number of driving steps of each stepping motor is counted within the microcomputer 16 to find the absolute position of each of the lens units 4 and 2. Information on the focal length can be accurately obtained by this arrangement. A diaphragm driving circuit 21 is provided for opening and closing the diaphragm 5 under the control of the microcomputer 16. The aperture of the diaphragm 5 is controlled on the basis of information B on luminance of the video signal taken in the microcomputer 16. Information on the diaphragm aperture thus obtained is detected by an aperture value detecting circuit 22 and is supplied to the microcomputer 16.

Figure 6:
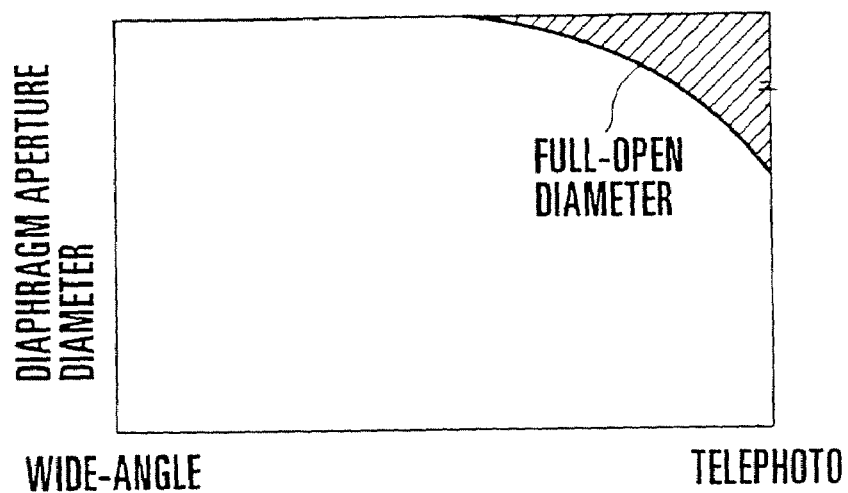
FIG. 6 is a graph for explaining the limitation of the full-open aperture diameter of a diaphragm according to the focal length in the optical apparatus shown in FIG. 5.
Figure 7:
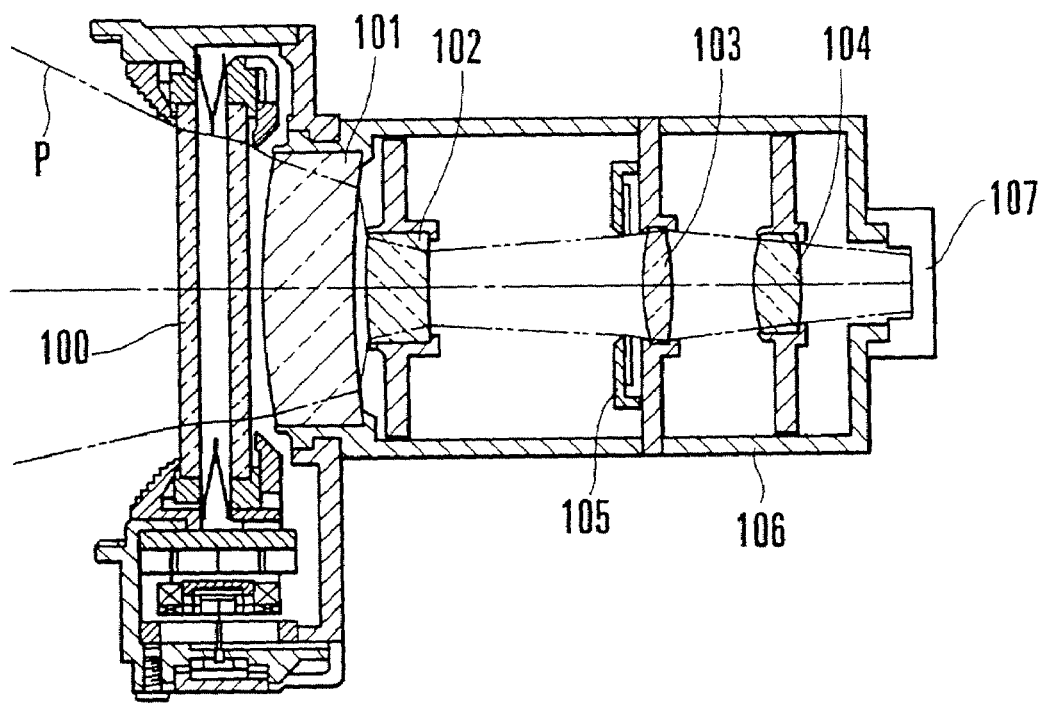
FIG. 7 is a longitudinal sectional view of the conventional optical apparatus having an image shake correcting function.
Figure 8:
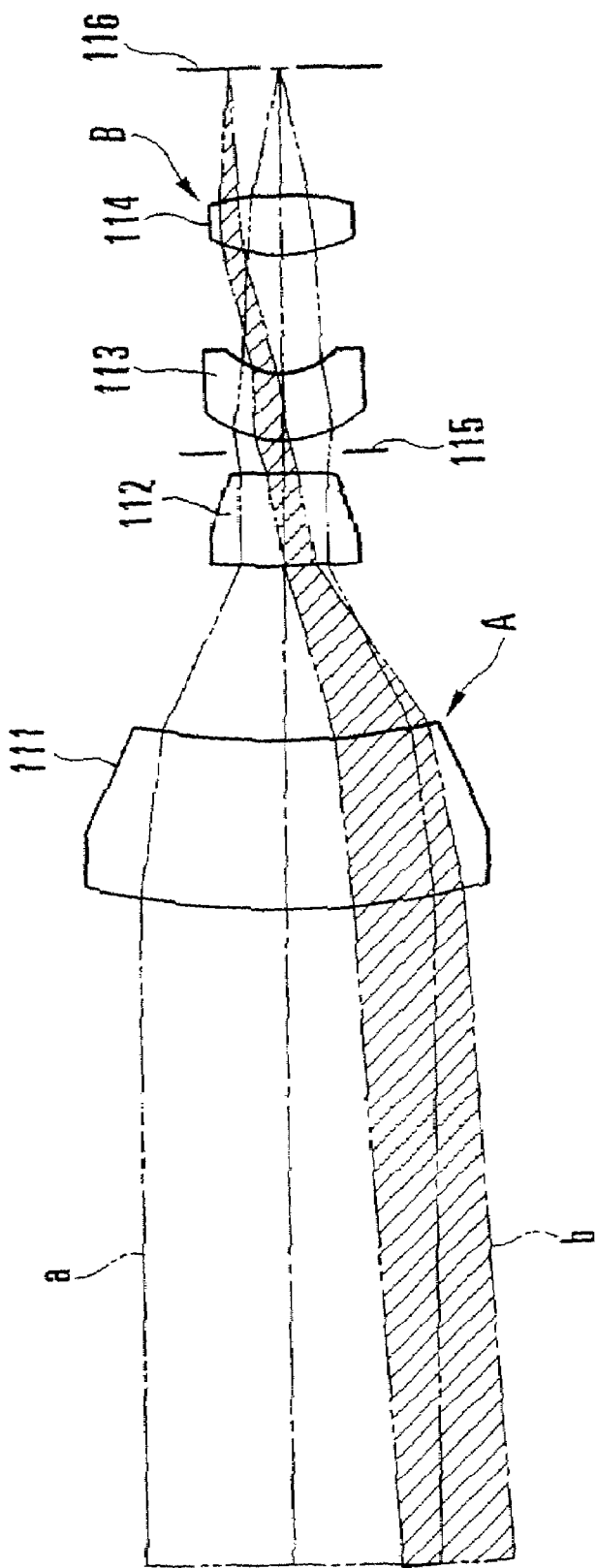
FIG. 8 is a diagram for explaining how the quantity of light drops in the peripheral part of an image plane due to vignetting.
Figure 9:
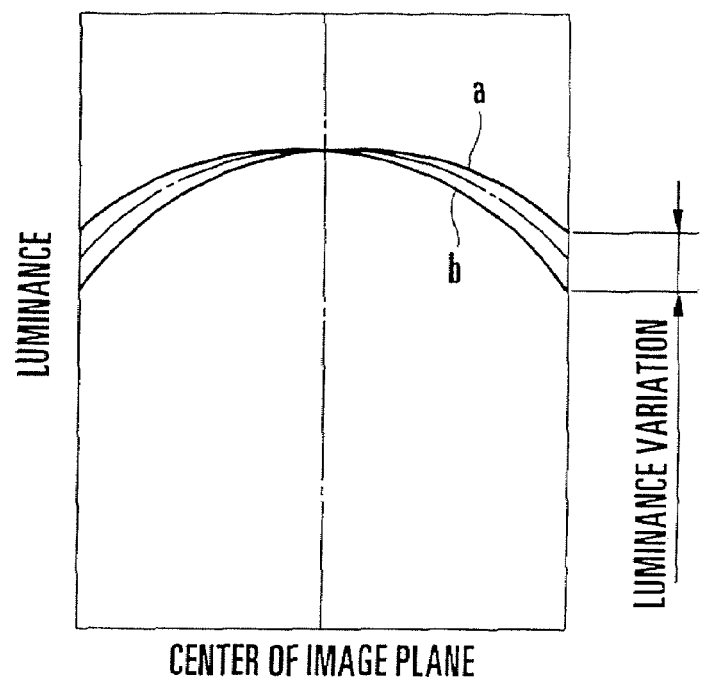
FIG. 9 is a graph for explaining the variation of the light quantity distribution.
Figure 10:
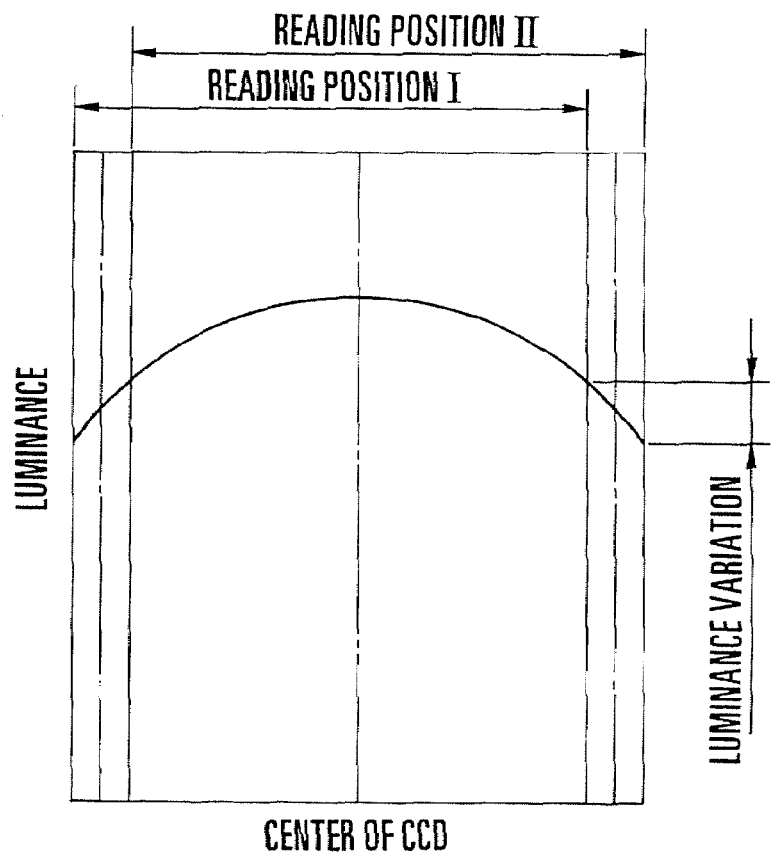
FIG. 10 is a graph for explaining the variation of the luminance on an image plane in the case of electronic image stabilization.

By the aperture control operation, the full-open (maximum) aperture diameter of the diaphragm is limited according to the focal length to have some area where the diaphragm is not opened as indicated by a hatched part of FIG. 6, which shows the focal length on the abscissa axis and the full-aperture diameter of the diaphragm on the ordinate axis. Under this aperture control, a difference in luminance between the central part and the peripheral part of the image plane can be kept small, particularly by cutting off the on-axial light flux on the side of the telephoto end position.

Although the structure of an optical system is generally arranged to have a smaller luminance difference between the central part and the peripheral part of an image plane in the telephoto end than in the wide-angle end, an image formed on a image forming plane is caused by one and the same image shake to move to a greater extent in proportion to the focal length in the telephoto end than in the wide-angle end. Therefore, the problem of luminance variations on the image plane caused by actual image shakes becomes more serious at the telephoto end than at the wide-angle end. This calls for some improvement in light quantity distribution obtained in the neighborhood of the telephoto end of the lens system.

The optical apparatus is provided with a pitch angle (vertical slanting angle) detecting circuit 23 and a yaw angle (horizontal slanting angle) detecting circuit 24. Each of these angles is detected by integrating the output of an angular velocity sensor which, for example, is a vibration gyro or the like secured to the optical apparatus. The outputs of the two angle detecting circuits 23 and 24 which show information on slanting angles of the optical apparatus are supplied to the microcomputer 16.

For moving the lens unit 3 in correcting image shakes, the optical apparatus is provided with pitch (vertical) and yaw (horizontal) coil driving circuits 25 and 26. Each of the pitch coil driving circuit 25 and the yaw coil driving circuit 26 is arranged to generate a driving force for the lens unit 3 by the so-called moving coil device in which a coil is disposed at a gap of a magnetic circuit having a magnet.

A pitch (vertical) position detecting circuit 27 and a yaw (horizontal) position detecting circuit 28 are provided for detecting amounts of shift of the lens unit 3 with respect to the optical axis. Each of the circuits 27 and 28 is arranged, for example, to have a light emitting element and a light receiving element fixedly opposed to each other, to have a slit which is formed in the shift frame 9 interposed in between these light emitting and receiving elements, and to obtain a shift amount of the lens unit 3 as an electrical signal. The information on the amount of shift thus obtained is also supplied to the microcomputer 16.

The operation of the first embodiment is as follows.

When the lens unit 3 moves in a direction perpendicular to the optical axis, a light flux passing there is bent. As a result, the position of an object image formed on the CCD 13 moves. The microcomputer 16 then controls and causes the optical system to move to the same amount as the movement amount of the image position actually caused by the slant of the optical apparatus in a direction opposite to the direction in which the object image moves. The image shake correcting action is thus can be carried on to keep the formed image unshakable even when the optical apparatus slants to shake the image.

Within the microcomputer 16, shift-amount signals obtained from the pitch position detecting circuit 27 and the yaw position detecting circuit 28 indicating the shift amounts of the lens unit 3 are respectively subtracted from inclination signals obtained from the pitch angle detecting circuit 23 and the yaw angle detecting circuit 24 indicating the inclinations of the optical apparatus to obtain difference signals. Then, the pitch coil driving circuit 25 and the yaw coil driving circuit 26 are caused to drive the shift frame 9 according to the difference signals. Under this control, the lens unit 3 is driven to make the difference signals smaller, so that the image can be kept at an objective position.

In the case of the first embodiment, the lens unit 3 which is arranged to be shifted in a direction perpendicular to the optical axis is disposed closer to an image pickup surface than the variator lens unit 2. The moving amount of the image in relation to the amount of shift of the lens unit 3 comes to vary according to the position of the variator lens unit 2, i.e., according to the focal length. The amount of shift of the lens unit 3 is, therefore, decided not merely according to the optical-apparatus inclination signals obtained from the pitch angle detecting circuit 23 and the yaw angle detecting circuit 24 but is corrected also according to information on the position of the variator lens unit 2. The movement of the image due to the slant of the optical apparatus is thus arranged to be canceled by shifting the lens unit 3 in this manner.

In the first embodiment, the aperture position of the diaphragm which is arranged to vary the quantity of a light flux passing through the optical system is controlled electrically to limit the full-open aperture diameter of the diaphragm according to the focal length. More specifically, the full-open aperture diameter of the diaphragm is controlled to decrease accordingly as the position of the lens system shifts from the wide-angle end position to the telephoto end position. In a case where no image shake correcting action is required, therefore, the optical system is usable in a brighter full-open state at its telephoto end position by removing the limitation on the full-open aperture diameter of the diaphragm. It is also possible to change the arrangement to have some auxiliary diaphragm arranged near to a main (F-number determining) diaphragm to mechanically impose the above-stated limitation on the full-open aperture diameter in a sate of being interlocked with the movement of the variator lens unit 2, as will be described later herein.

The first embodiment described above makes the image shake correction by shifting, in a direction perpendicular to the optical axis, the third lens unit of the variable magnification optical system composed of four lens units which are arranged to have refractive powers in the order of positive, negative, positive and positive refractive powers. However, the type of the optical system and the lens unit to be shifted are not limited to those of the first embodiment described above. The invention is applicable also to an optical image shake correcting arrangement having a variable angle prism within a variable magnification optical system and also to an electronic image shake correcting arrangement for the so-called electronic image stabilization. More specifically, the invention is applicable also to an apparatus arranged to attain an image shake correcting effect by processing an electrical signal obtained from an image sensor which is arranged on the image forming plane to convert an optical image into an electrical signal.

In the first embodiment described above, a variable magnification optical system having the image shake correcting function is arranged to limit, according to the focal length, the full-open aperture diameter of a diaphragm which is provided for controlling the amount of a light flux passing through the optical system. By this, a difference in luminance between the central and peripheral parts of an image plane can be lessened particularly in the neighborhood of a telephoto end position of the optical system where the difference becomes salient. Therefore, an optical apparatus can be arranged to be capable of giving high quality images according to the arrangement of the invention.

A second embodiment of the invention, which is a more concrete example, is next described below.

Figure 11:
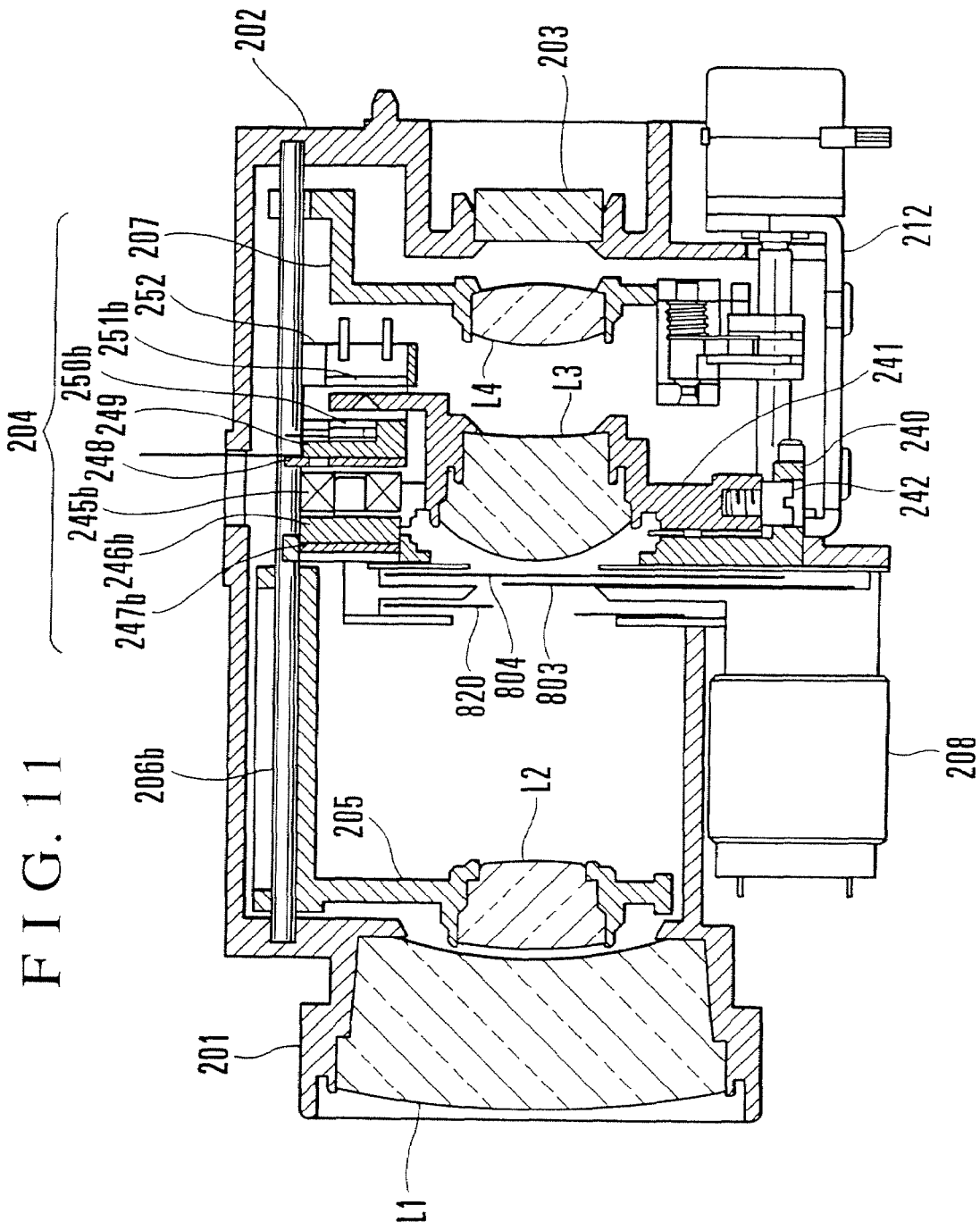
FIG. 11 is a sectional view showing essential parts of a zoom lens for a video camera to which the invention is applied as a second embodiment thereof.
Figure 12:
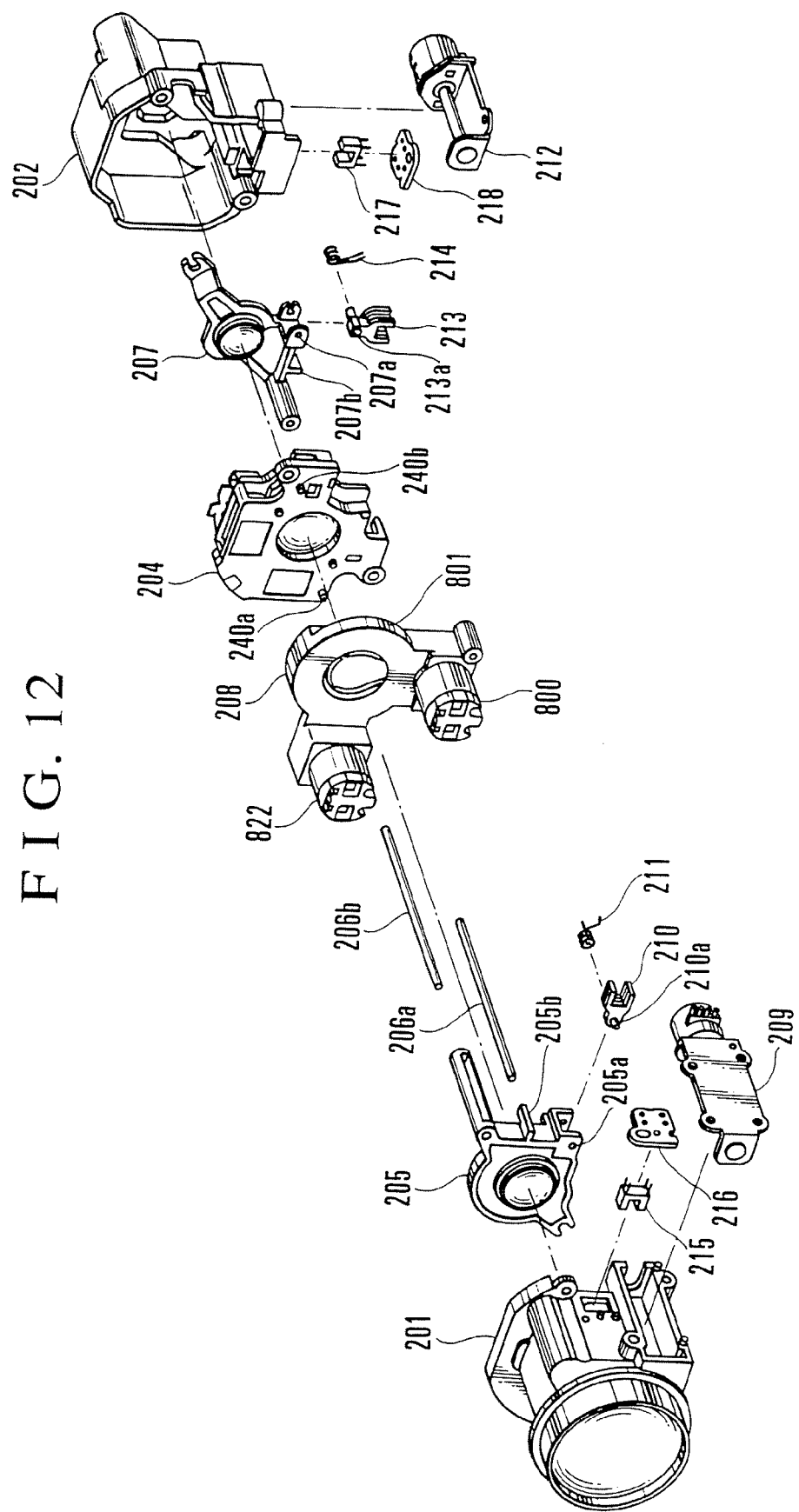
FIG. 12 is an exploded perspective view showing a zoom lens barrel shown in FIG. 11.

FIG. 11 is a sectional view showing essential parts of a zoom lens (barrel) for a video camera to which the invention is applied as the second embodiment. FIG. 12 is an exploded perspective view showing in part the zoom lens barrel shown in FIG. 11.

Referring to FIGS. 11 and 12, a fixed tube 201 is arranged to hold a first lens unit L1. A rear tube 202 is arranged to hold a low-pass filter 203. A CCD image sensor which is not shown is mounted in rear of the low-pass filter 203. An image shake correcting unit 204 is arranged to hold a third lens unit L3 which is arranged as a correction lens to be driven in a direction perpendicular to an optical axis. The image shake correcting unit 204 is interposed in between the fixed tube 1 and the rear tube 2 and is fixed in position with screws. A second lens tube 205 is arranged to hold a second lens unit L2 which is provided for zooming. Two guide bars 206a and 206b are arranged to be supported respectively at their front and rear parts by the fixed tube 201 and the rear tube 202 and to have the second lens tube 205 movable in the direction of the optical axis. A fourth lens tube 207 is arranged to hold a fourth lens unit L4 which is provided for focus adjustment. As in the second lens tube 205, the fourth lens tube 207 is supported also by the guide bars 206a and 206b to be movable in the direction of the optical axis. The two guide bars 206a and 206b are arranged along the optical axis and on opposite sides of the optical axis not only to guide the second and fourth lens tubes 205 and 207 but also to prevent the second and fourth lens tubes 205 and 207 from turning around the optical axis.

Figure 14:
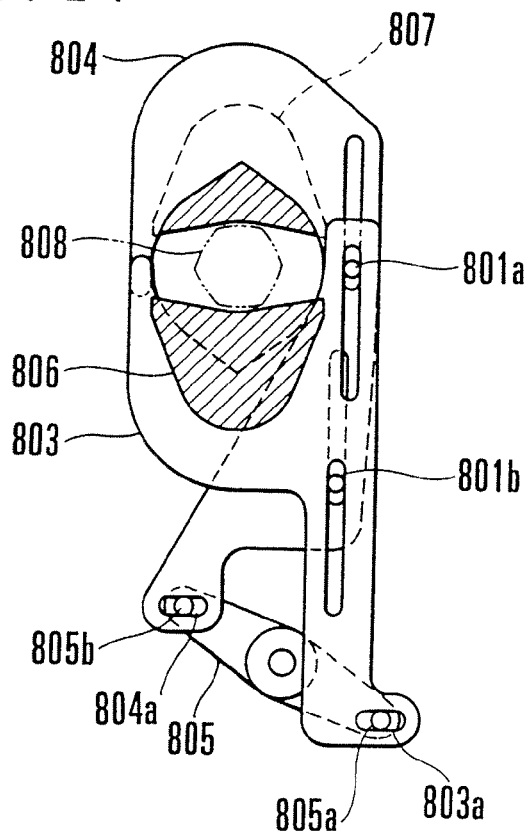
FIG. 14 is a plan view showing a first diaphragm means included in the zoom lens shown in FIG. 11.

An IG meter (IG meter unit) 208 is arranged to drive, by means of an electromagnetic actuator, diaphragm blades 803 and 804 which jointly constitute a first diaphragm means, as shown in FIG. 14. The IG meter 208 is carried jointly by the fixed tube 201 and the image shake correcting unit 204 in a state of being interposed in between them. ND filters 806 and 807 are mounted on the front side of the diaphragm blade 803 and on the rear side of the diaphragm blade 804, respectively. The aperture diameter of the first diaphragm means is arranged to be variable according to the quantity of light incident on the CCD (sensor). Diaphragm blades 820 constitute a second diaphragm means. The second diaphragm means is composed of, in the case of the second embodiment, six diaphragm blades 820. The diameter of an aperture defined by the diaphragm blades 820 is arranged to be variable according to the zooming position of the zoom lens, in such a manner that the quantity of on-axial light and that of off-axial light obtained when the image shake correcting unit 204 is driven to decenter the third lens unit L3 are balanced with each other by restricting the on-axial light flux obtained with the optical system on its telephoto side. Incidentally, the first diaphragm means is arranged to substantially determine an F-number of the zoom lens.

A zoom motor 209 has its driving part and its output screw part held in one body by means of a U-shaped metal plate. The zoom motor 209 is secured to the fixed tube 201 with screws. A rack 210 is mounted on the second lens tube 205. The second lens tube 205 is arranged to be driven in the direction of the optical axis with the rack 210 in mesh with the screw part of the zoom motor 209. In this case, any intermeshing play and any back-lash in the direction of thrust are removed by a spring 211 which is arranged to urge the rack 210 in the direction of intermeshing and in the direction of the optical axis.

A focus motor 212 is arranged in a manner similar to the zoom motor 209 and is secured to the rear tube 202 with screws. A rack 213 and a spring 214 are mounted on the fourth lens tube 207, as in the case of the second lens tube 205. The fourth lens tube 207 is thus arranged to be driven and moved in the direction of the optical axis with the rack 213 and the screw part of the focus motor 212 intermeshing with each other.

The racks 210 and 213 respectively have their shaft parts 210a and 213a fitted into hole parts 205a and 207a which are formed in the second lens tube 205 and the fourth lens tube 207 in such a way as to extend in the direction of the optical axis, and are thus arranged to be swingable on the shaft parts 210a and 213a with respect to the second lens tube 205 and the fourth lens tube 207. Therefore, even in a case where there is some discrepancy in parallelism among the guide bars 206a and 206b and the output shafts of the motors 209 and 212, the second lens tube 205 and the fourth lens tube 207 can be smoothly moved. Further, the racks 210 and 213 are urged in the direction of swing by the springs 211 and 214 to cause meshing parts of the racks 210 and 213 to be in pressed contact with their corresponding motor output screws. The meshing parts of the racks 210 and 213 thus can be reliably meshed with the male screws of the motor output shafts. In the case of the second embodiment, stepping motors are employed as the zoom motor 209 and the focus motor 212.

A photo-interrupter 215 is secured to the fixed tube 201 with a screw after it is soldered to a circuit board 216. The photo-interrupter 215 is arranged to detect the datum position of the second lens tube 205 with a light blocking wall part 205b which is formed integrally with the second lens tube 205 passing through an interval between the light projecting part and the light receiving part and to allow the zoom motor 209 to move the second lens tube 205 to each zooming position according to the number of pulses inputted to the zoom motor 209. Focus adjustment is also likewise arranged to be made by detecting a light blocking wall part 207b of the fourth lens tube 207 as a datum position with a photo-interrupter 217 and a circuit board 218 which are mounted on the rear tube 202 and by driving the focus motor 212 stepwise as necessary.

The image shake correcting unit 204 is arranged as follows.

Figure 13:
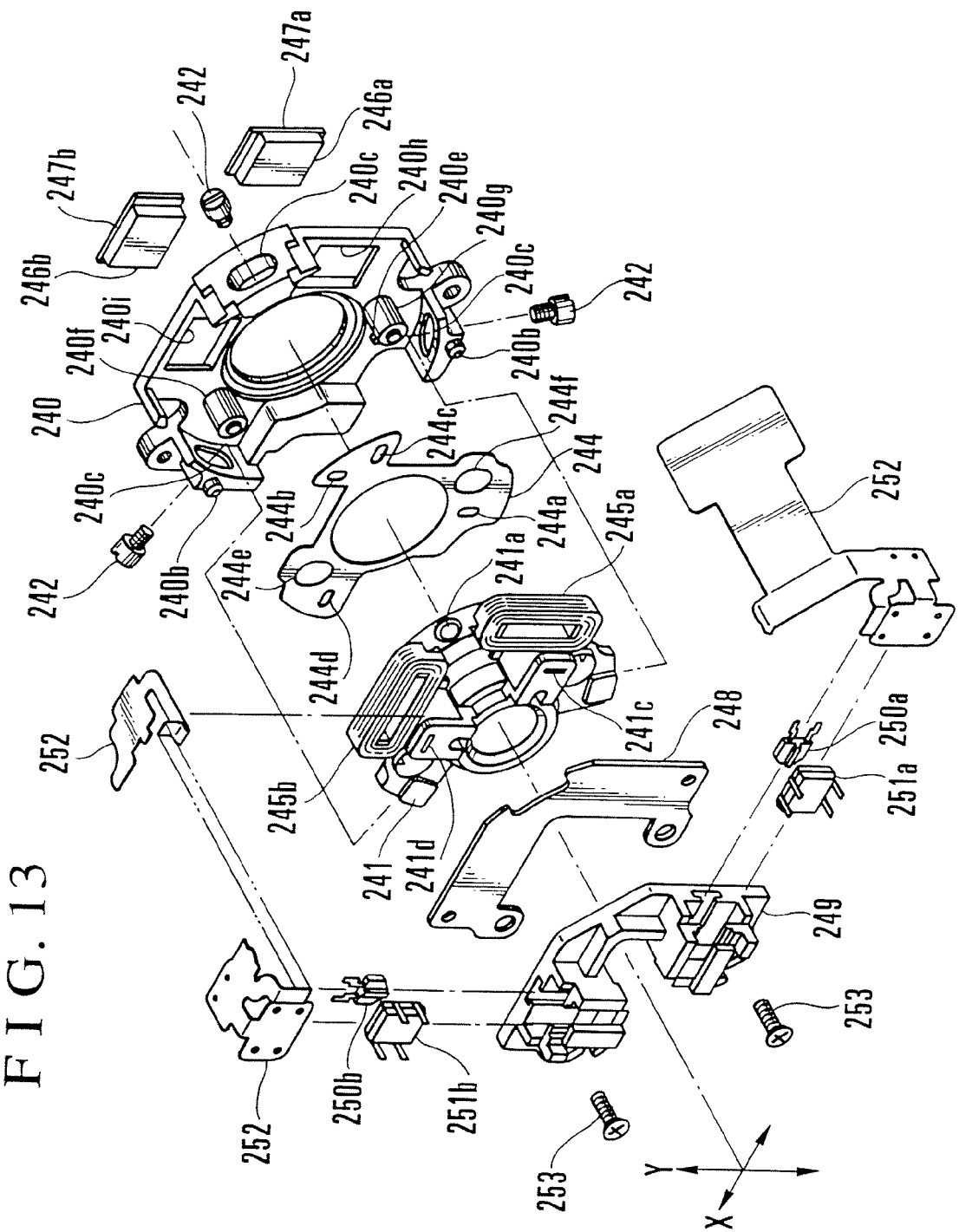
FIG. 13 is an exploded perspective view of an image shake correcting unit mounted on the zoom lens shown in FIG. 11.

FIG. 13 is an exploded perspective view of the image shake correcting unit 204 in the second embodiment. In FIG. 13, reference numeral 240 denotes a fixed frame. The fixed frame 240 is provided with two bosses 240a (see FIG. 12) for positioning the fixed frame 240 with respect to the fixed tube 201 and two bosses 240b for positioning the fixed frame 240 with respect to the rear tube 202. The image shake correcting unit 204 is thus carried jointly by the fixed tube 201 and the rear tube 202. A moving frame 241 is arranged to hold the third lens unit L3, which is an image shake correction lens.

The moving frame 241 is provided with three holes 241a in its periphery with pins 242 secured to the holes 241a. The pins 242 are fitted into slots 240c of the fixed frame 240. The moving frame 241 is arranged to be movable in a direction perpendicular to the optical axis within a predetermined range with respect to the fixed frame 240 as the pins 242 are thus arranged to smoothly slide in the slots 240c.

The pins 242 and the slots 240c corresponding to them are evenly spaced at intervals of 120° within one and the same plane and are arranged in a balanced state to have no moment around the optical axis caused to act on the moving frame 241 by a load brought about by any sliding friction. A roll preventing plate 244 is arranged to prevent the moving frame 241 from turning around the optical axis in correcting image shakes. The roll preventing plate 244 is provided with slots 244a and 244b which are fitted on a boss 240e provided on the fixed frame 240 and a boss which is not shown. Other slots 244c and 244d provided also in the roll preventing plate 144 are fitted on bosses (not shown) which are provided on the moving frame 241. Hole parts 244e and 244f which are provided in the roll preventing plate 244 for allowing support posts 240f and 240g formed integrally with the fixed frame 240 to pierce through these hole parts. The arrangement is such that, even if the roll preventing plate 244 moves to its maximum extent, the support posts 240f and 240g do not interfere with the roll preventing plate 244. In other words, the roll preventing plate 244 is arranged to move only in the vertical direction as viewed in FIG. 13 with respect to the fixed frame 240 while the moving frame 241 is arranged to be movable only horizontally as viewed in FIG. 13 with respect to the roll preventing plate 244. The combination of these moving directions enables the moving frame 241 to move vertically and horizontally as viewed in FIG. 13 without turning or rolling around the optical axis with respect to the fixed frame 240.

A method for driving the moving frame 241 is next described.

Coils 245a and 245b which are secured to the moving frame 241 are provided for driving the moving frame 241 in the horizontal direction (hereinafter referred to as the X direction) and in the vertical direction (hereinafter referred to as the Y direction). Magnets 246a and 246b are respectively magnetized to have two poles in the X and Y directions. The magnets 246a and 246b are secured to the fixed frame 240 and fixed in position with lower yokes 247a and 247b which are made of iron or the like arranged to attract them from behind the fixed frame 240 to cause them to be inserted respectively through hole parts 240h and 240i of the fixed frame 240. An upper yoke 248 which is made of the same material as the lower yokes 247a and 247b is secured with screws 253 to the support posts 240f and 240g of the fixed frame 240 from its front side together with a sensor holder 249 which will be described later. The upper yoke 248 is thus arranged to form a magnetic circuit for driving in the X and Y directions. More specifically, a magnetic circuit is formed for driving in the X direction jointly by the magnet 246a, the lower yoke 247a and the upper yoke 248 with the coil 245a inserted in the magnetic circuit. Another magnetic circuit is formed for driving in the Y direction jointly by the magnet 246b, the lower yoke 247b and the upper yoke 248 with the coil 245b inserted therein. An electromagnetic actuator of the moving coil type is formed in this manner.

Light projecting elements 250a and 250b are IREDs or the like. Light receiving elements 251a and 251b are PSDs or the like. These elements are inserted into the sensor holder 249 from its peripheral side and are fixed in position by bonding. Narrow slits 241c and 241d which are formed integrally with the moving frame 241 are inserted in between each of the pairs of the light-projecting and light-receiving elements. Of infrared light rays projected from the light projecting elements 251a and 251b, only the infrared rays passing through the slits 241c and 241d are receive-d by the light receiving elements 251a and 251b. The positions of the moving frame 241 in the X and Y directions are detected by using the infrared rays thus received. The light projecting elements 250a and 250b and the light receiving elements 251a and 251b are connected to a flexible printed circuit board 252 (shown in a divided state in FIG. 13) and are thus connected to a control circuit provided on the side of a camera body which is not shown. The wiring of the coils 245a and 245b is connected to a driving circuit which is also disposed on the side of the camera body.

The diaphragm unit in the second embodiment is next described.

FIG. 14 is a plan view of the IG meter unit 208. The IG meter unit 208 includes the diaphragm blades 803 and 804 which constitute the first diaphragm means. The diaphragm blades 803 and 804 are held by a fixed frame 801 to be movable in parallel with each other in the vertical direction as viewed in FIG. 14, in a state of being guided by the bosses 801a and 801b which are formed integrally with the fixed frame 801. Bosses 805a and 805b are provided on an arm 805 which is arranged integrally with the rotating shaft of a meter 800. The bosses 805a and 805b engage slots 803a and 804a which are provided respectively in the diaphragm blades 803 and 804. ND filters 806 and 807 are attached to the diaphragm blades 803 and 804 by bonding. The ND filters 806 and 807 are thus arranged to reduce a light quantity to prevent the aperture diameter from becoming a predetermined aperture diameter because the quality of images deteriorates due to an adverse effect of diffraction if the aperture diameter becomes too small. To prevent the ND filters 806 and 807 from coming into sliding contact with the diaphragm blades 803 and 804, the ND filters 806 and 807 are disposed respectively in front of the diaphragm blade 803 which is located on the front side of the optical axis and in rear of the diaphragm blade 804.

When the diaphragm blades 803 and 804 are fully opened, the ND filters 806 and 807 are in a state of being located at an optical path. The ND filters 806 and 807 come to completely cover the optical path when the aperture reaches a predetermined aperture value position. When the aperture is further stopped down, the aperture is completely covered by the diaphragm blades 803 and 804. Further, the two upper and lower ND filters 806 and 807 are arranged to simultaneously enter the optical path to make the variation of the peripheral light quantity on the image plane uniform in correcting image shakes.

Figure 15:
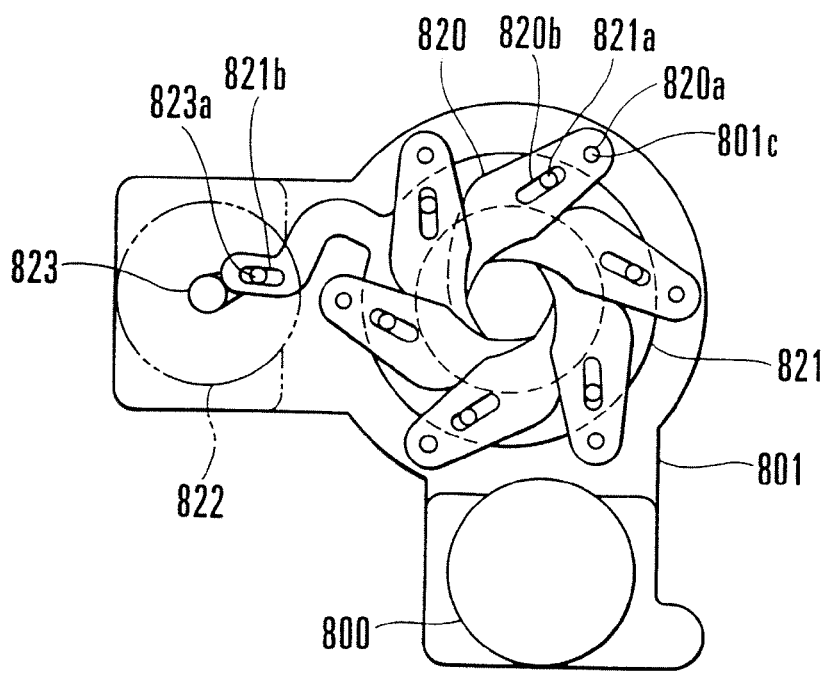
FIG. 15 is a plan view showing a second diaphragm means included in the zoom lens in FIG. 11.

FIG. 15 shows the arrangement of the second diaphragm means in the second embodiment. In FIG. 15, reference numeral 820 denotes six blades. Each of the blades 820 is swingably carried by the fixed frame 801 with its hole part 820a engaging a boss 801c provided on the fixed frame 801. Each of the blades 820 is provided with a slot 820b which engages one of bosses 821a provided on a ring 821 which is arranged to be rotatable around the optical axis. The ring 821 has a slot 821b formed in a part extending from its periphery. The slot 821b of the ring 821 engages a boss 823a of an arm 823 which is fixedly attached to the rotating shaft of a second diaphragm driving meter 822. Therefore, the rotation torque of the meter 822 is transmitted through the arm 823 to the ring 821 to cause the ring 821 to rotate. The rotation of the ring 821 causes the six blades 820 to swing on the holes 820a in such a way as to vary the aperture diameter.

The second diaphragm means is thus arranged to vary the diameter of an aperture according to the zooming position of the lens system irrespective of the quantity of light. In correcting image shakes, the second diaphragm means serves to alleviate variations taking place in the peripheral light quantity on the image plane. In the case of the image-shake correction by the shift method, the correction lens is disposed inside the optical system. Therefore, a peripheral light flux is determined by an optical system disposed in front of the correction lens. The quantity of peripheral light then varies when the light flux is bent by the correction lens at the time of image shake correction. In most of zoom lenses, a light flux is restricted on the side of a telephoto end by the effective diameter of a front lens. Therefore, a difference in light quantity between a central part and a peripheral part of an image plane increases on the side of the telephoto end. In view of this, the second embodiment is arranged to appositely restrict the peripheral light flux by lessening the aperture diameter of the diaphragm accordingly as the position of the optical system shifts from its wide-angle side toward its telephoto end in such a way as to alleviate a change of the peripheral light quantity even when the correction lens is shifted.

Figure 16:
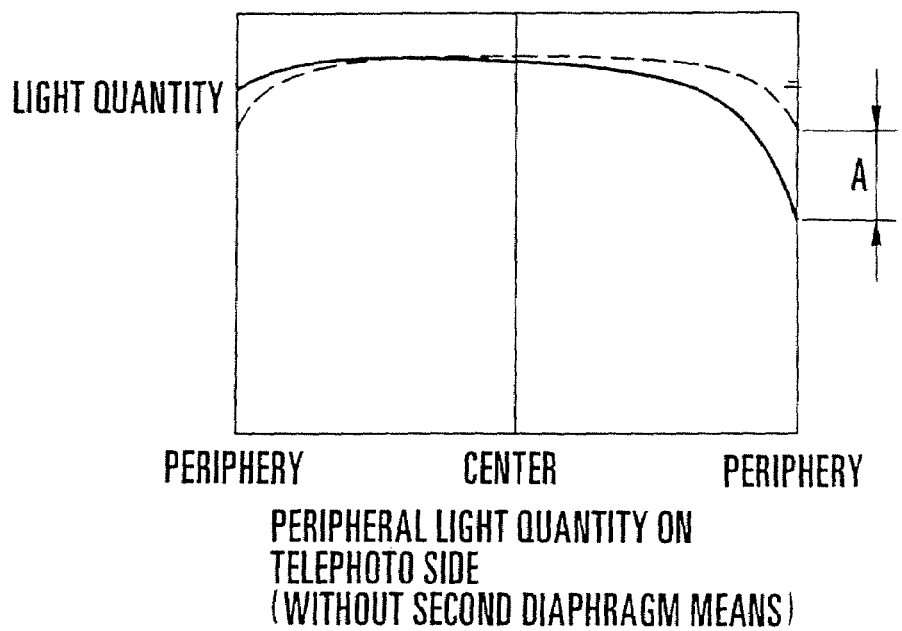
FIG. 16 is a graph for explaining the variation of a peripheral light quantity in a case where the second embodiment is not provided with the second diaphragm means.
Figure 17:
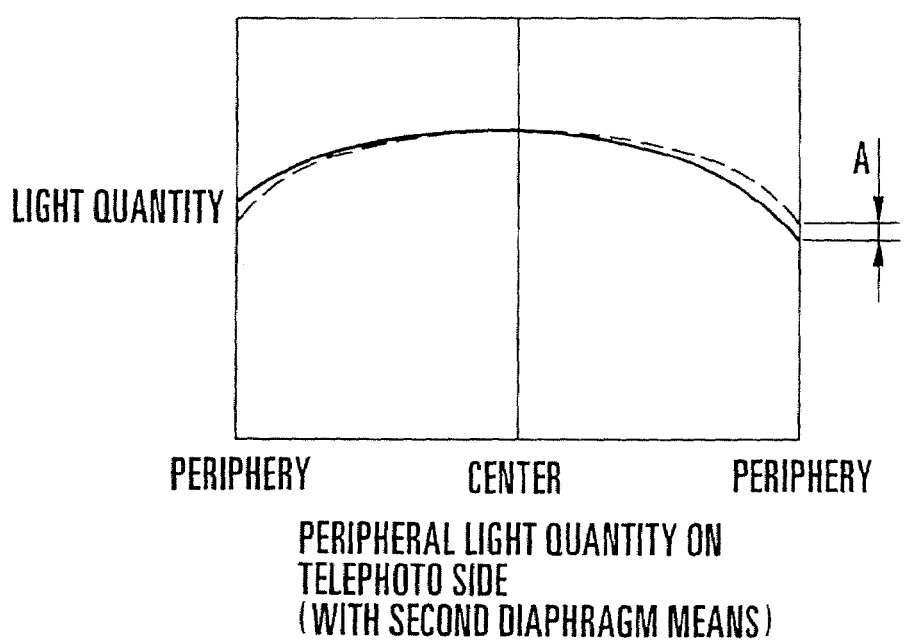
FIG. 17 is a graph for explaining the variation of a peripheral light quantity in a case where the second embodiment is provided with the second diaphragm means.

FIGS. 16 and 17 are graphs showing the peripheral light quantity obtained by shifting the correction lens at the telephoto end. In each of these graphs, positions from the center of the image plane are shown in the horizontal direction and the quantities of light in the vertical direction. FIG. 16 shows the peripheral light quantity obtained without using the second diaphragm means. FIG. 17 shows the peripheral light quantity obtained with the second diaphragm means used. In each of FIGS. 16 and 17, a broken line shows a state of having the correction lens at the center of the optical axis, and a full line shows a state of having the correction lens shifted. The state of the full line and the state of the broken line are considered to appear one after another while the image shake correction is in process. Therefore, luminance differences indicated with a reference symbol A appear one after another in the peripheral part of the image plane to give a disagreeable impression to the eye. As shown in FIGS. 16 and 17, although the absolute light quantity becomes less in the case of FIG. 17 with the second diaphragm means used than in the case of FIG. 16, the change A of the peripheral light quantity which takes place at the time of image shake correction can be lessened by the use of the second diaphragm means in the case of FIG. 17.

To avoid having the peripheral light quantity unnaturally vary at the time of image shake correction, the aperture is preferably arranged to be in a shape as close to a circle as possible. Further, in FIG. 14, a two-dot-chain line 808 represents an aperture shape of the second diaphragm means obtained in the telephoto end. The aperture is shaped in such a way as to be not affected by the ND filters 806 and 807 in the telephoto end even in a case where the diameter of the aperture 808 of the second diaphragm means is variable.

Control over the image shake correcting unit 204 and the diaphragm unit 208 is next described as follows.

Figure 18:
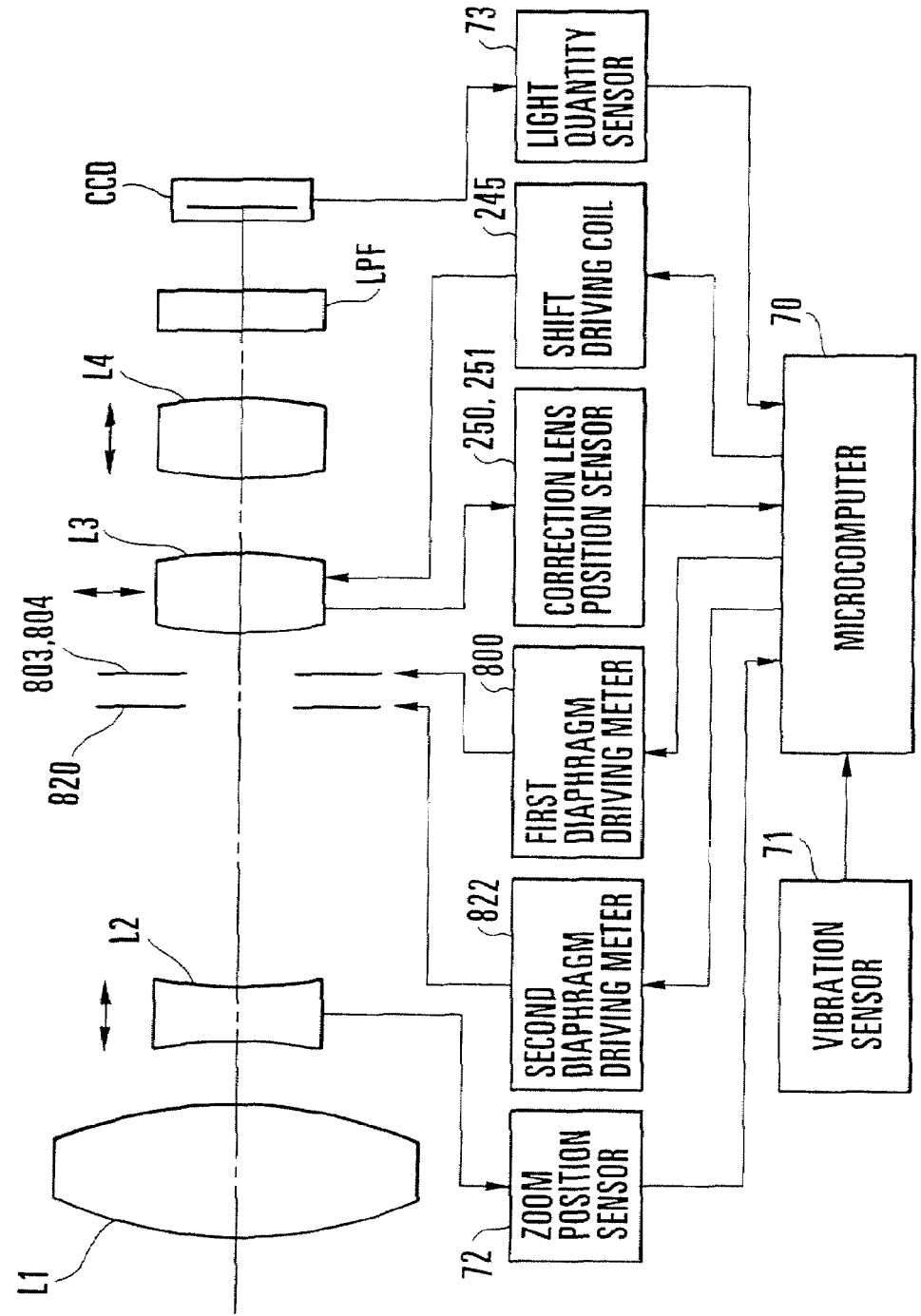
FIG. 18 is a block diagram showing a system for image shake correction control and diaphragm control arranged in the second embodiment.

FIG. 18 shows a system provided for the above control. A microcomputer 70 is arranged to preside over the control of the whole control system. A vibration sensor 71 is composed of a vibration gyro, etc., and is arranged to detect vibration of the camera as an angular velocity or an angle.

The microcomputer 70 computes the amount of vibration of the camera on the basis of a detection signal obtained from the vibration sensor 71 and computes a target (or objective) position of the correction lens L3 at which an image shake resulting from the vibration of the camera can be canceled. Then, according to the result of computation of the amount of movement, the coils 245a and 245b of the electromagnetic actuator are energized to drive the correction lens L3. In driving the correction lens L3, the position of the correction lens L3 is detected by correction lens position sensors 50 and 51. The result of such detection is fed back to the microcomputer 70, so that the correction lens L3 can be accurately driven and moved to the target position computed.

In the zoom lens, the amount of movement (the target position) of the correction lens L3 for canceling an image shake varies according to the focal length. In view of this, the number of pulses with which the second lens unit L2 is driven is counted to detect the focal length by a zoom position sensor 72. Then, the amount of driving of the correction lens L3 is adjusted according to the focal length detected.

A light quantity sensor 73 is arranged to detect the quantity of light from a video signal obtained by the CCD. The microcomputer 70 causes the diaphragm blades 803 and 804 to be driven by energizing the first diaphragm driving meter 800 to obtain a predetermined quantity of light on the basis of a detection signal received from the light quantity sensor 73. Meanwhile, the second diaphragm driving meter 822 is energized to drive the blades 820 in such a way as to obtain a predetermined aperture diameter.

The second embodiment is arranged, as described above, to appositely restrict an on-axial light flux on the telephoto side (not restricting it on the wide-angle side) by the second diaphragm means according to the zoom position. Although the absolute quantity of light is decreased thereby, the variations taking place in the peripheral light quantity at the time of image shake correction is effectively lessened by this arrangement, so that image shakes can be corrected without causing images to give any disagreeable impression.

Further, in the second embodiment, the ND filter mounted on the first diaphragm means is prevented from coming partly into the optical path to bring about any asymmetric variations of the peripheral light quantity, so that images can be prevented from becoming unnatural.

Figure 19:
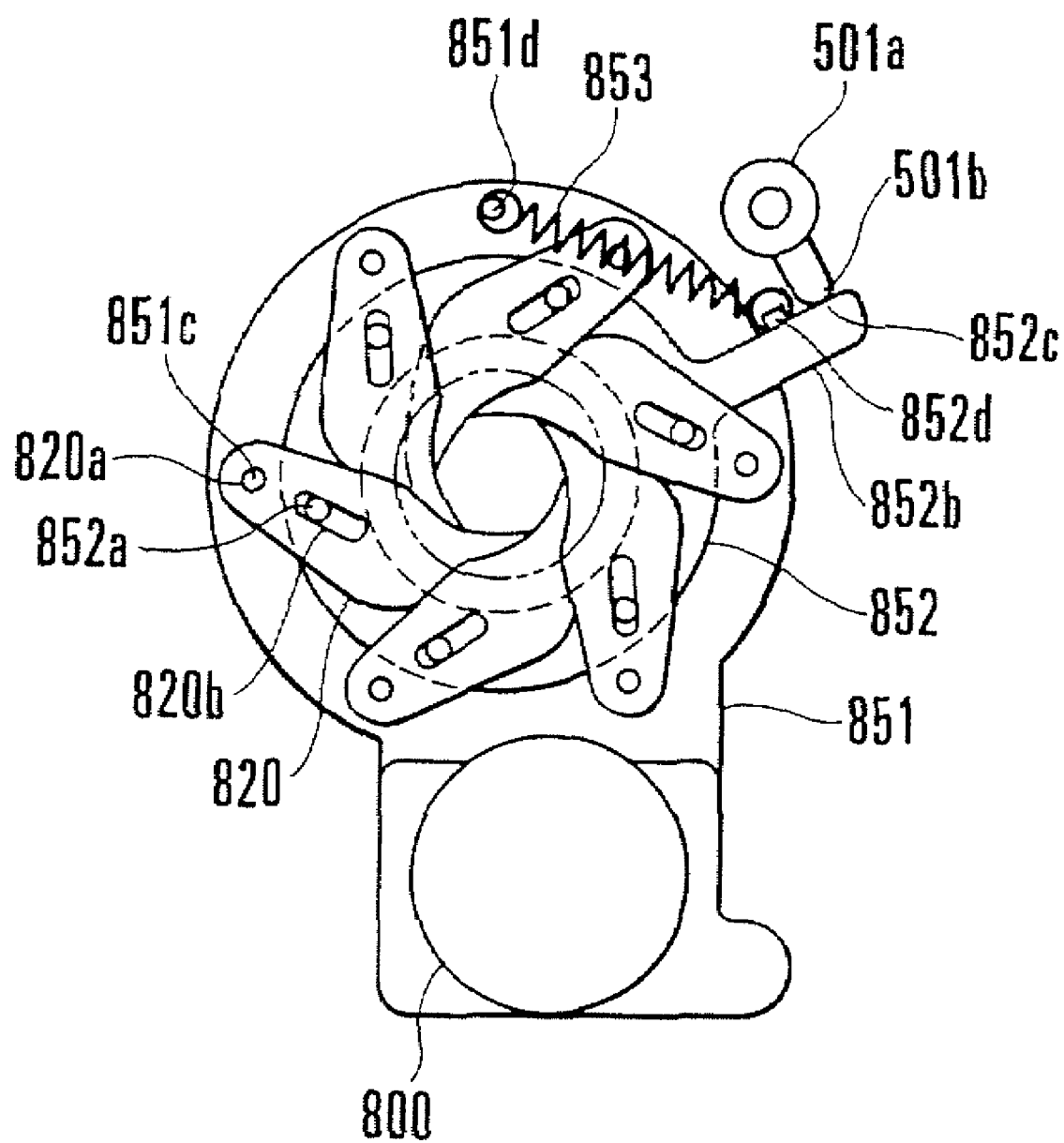
FIG. 19 is a plan view showing a diaphragm means arranged in a third embodiment of the invention.
Figure 20:
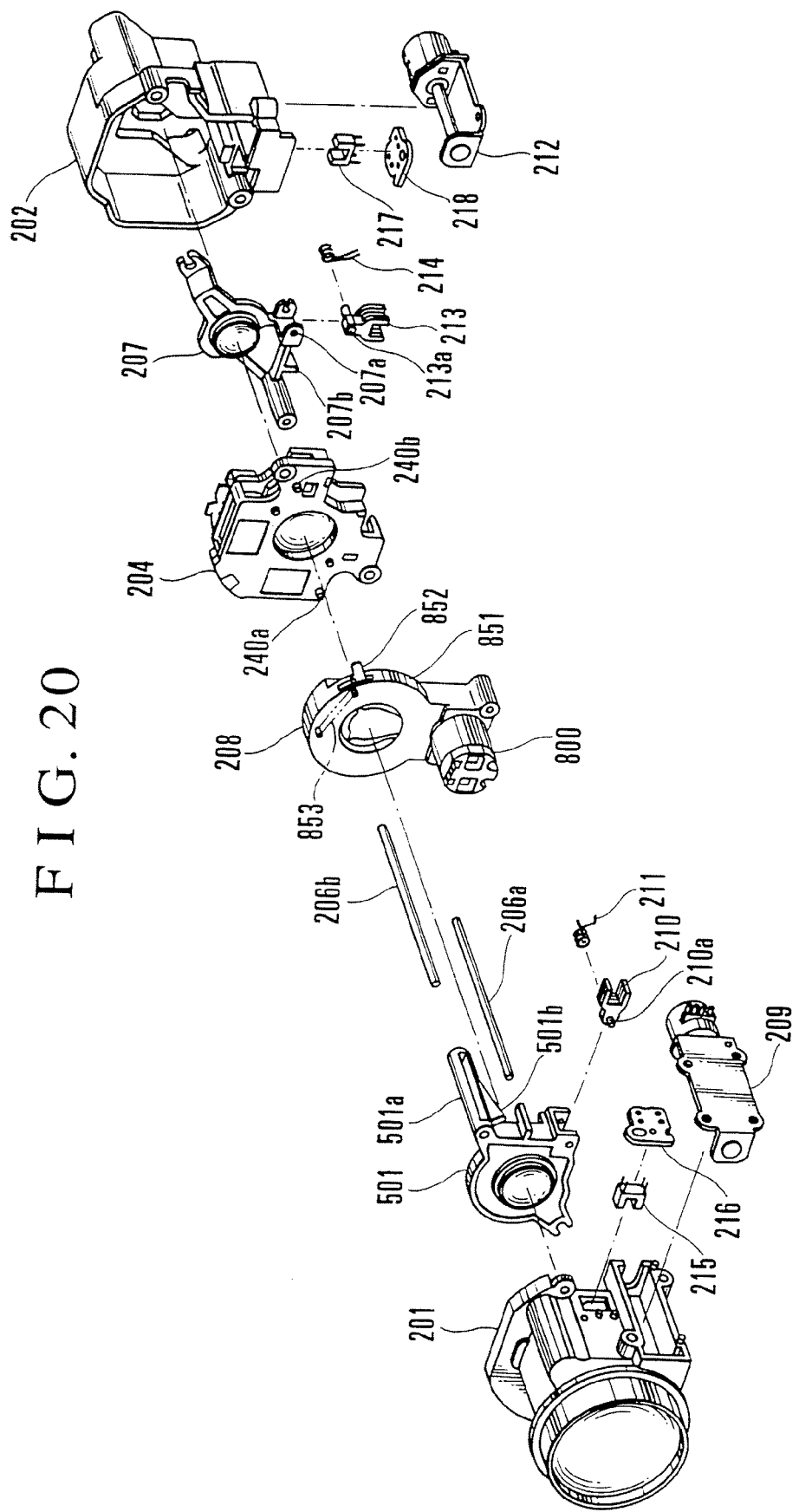
FIG. 20 is an exploded perspective view showing a zoom lens barrel according to the third embodiment of the invention.

FIGS. 19 and 20 show a diaphragm unit of an optical apparatus according to a third embodiment of the invention. The basic arrangement of the third embodiment is identical with that of the second embodiment. All the component elements of the third embodiment that are the same as those of the second embodiment are, therefore, indicated by the same reference numerals as those of the second embodiment, and details of them are omitted from the following description.

FIG. 19 shows in a plan view the second diaphragm means in the third embodiment. In FIG. 19, reference numeral 820 indicates six blades which are arranged in the same manner as in the second embodiment. Hole parts 820*a* of the blades 820 engage the bosses 851*c* provided on the fixed frame 851, so that the blades 820 are swingably carried. The blades 820 are provided with slots 820*b* which engage the bosses 852*a* provided on the ring 852 which is arranged to be rotatable around the optical axis.

As in the second embodiment, the third embodiment is also arranged to be capable of varying the aperture diameter by the rotation of the ring 821. In this case, however, the aperture diameter is arranged to be varied in association with the movement of the second lens tube 501 which is provided for zooming, instead of using the electromagnetic actuator.

In FIG. 19, only the sleeve part 501*a* of the second lens tube 501 is illustrated. The sleeve part 501*a* is provided with an end face cam 501*b*. The ring 852 has an arm part 852*b* extending from its periphery. The arm part 852 has an end face 852*c*. The rotating position of the ring 852 is restricted with the end face 852*c* arranged to abut on the end face cam 501*b* of the sleeve part 501*a* of the second lens tube 501. A tension coil spring 853 is attached at its one end to a hook 852*d* which protrudes from the arm part 852*b*. The other end of the spring 853 is attached to a projection 851*d* provided on the fixed frame 851. The coil spring 853 is thus arranged to constantly urge the end face 852*c* of the ring 852 to be pushed against the end face cam 501*b* of the sleeve part 501*a*.

FIG. 20 is an exploded perspective view of the third embodiment. As shown in FIG. 20, the front side of the end face cam 501*b* of the second lens tube 501 is in a shape which greatly protrudes forward. Therefore, the ring 852 comes to rotate against the urging force of the spring 853 to reduce the size of aperture formed by the blades 820 accordingly as the second lens tube 501 moves rearward, i.e., toward the telephoto end.

Since the arrangement of the third embodiment obviates the necessity of using an actuator for driving the blades, unlike in the case of the second embodiment, the third embodiment can be more simply arranged and also contributes to reduction in electric energy consumption.

While the third embodiment uses a moving coil type actuator for driving the correction lens, the same advantageous effect can be attained by replacing this actuator with a motor or an electrostrictive element or some other electromagnetic actuator.

Further, to have an aperture shape close to a circle and laterally and vertically symmetrical, the first diaphragm of the diaphragm unit is arranged to have two parallel moving blades and two ND filters attached thereto. The second diaphragm of the diaphragm unit is arranged, also for the same purpose, to have six blades. However, according to the invention, the diaphragm unit is not limited to the arrangement disclosed. For example, both the first and second diaphragms may be arranged to be composed of six blades or to be using two swinging type blades.

The arrangement of the third embodiment obviates the necessity of using an actuator for driving the second diaphragm means, so that deterioration of images at the time of image shake correction can be minimized with simple structural arrangement.

According to the arrangement of each of the second and third embodiments, a lens barrel or an optical apparatus using the lens barrel can be arranged to be suited for a high magnification zoom lens which never deteriorates its optical performance for an entire image plane even while image shake correction is in process.

A particularly advantageous feature of each of the second and third embodiments lies in the provision of the second diaphragm means which is arranged, in addition to an ordinary diaphragm (the first diaphragm means), to give a predetermined aperture diameter according to the zooming position of the optical system. In accordance with the invention, the second diaphragm means may be arranged to be driven by a meter by detecting a zooming position from the driving pulses of the lens barrel or to be driven according to the movement of a variator lens tube in a mechanically interlocked state. By such an arrangement, the peripheral light flux can be appositely limited according to zooming, so that the luminance variations taking place in the peripheral part of an image plane at the time of image shake correction can be lessened over the whole range of zooming.

A description will now be given of a different embodiment of the invention. In the foregoing description, an aperture diaphragm is specifically mentioned as being the light-quantity control device. The use of an aperture diaphragm as the light-quantity control device, however, is only illustrative and the invention may be implemented by incorporating different types of light-quantity control devices as described below. Embodiments employing such light-quantity control devices will now be described.

Figure 21:
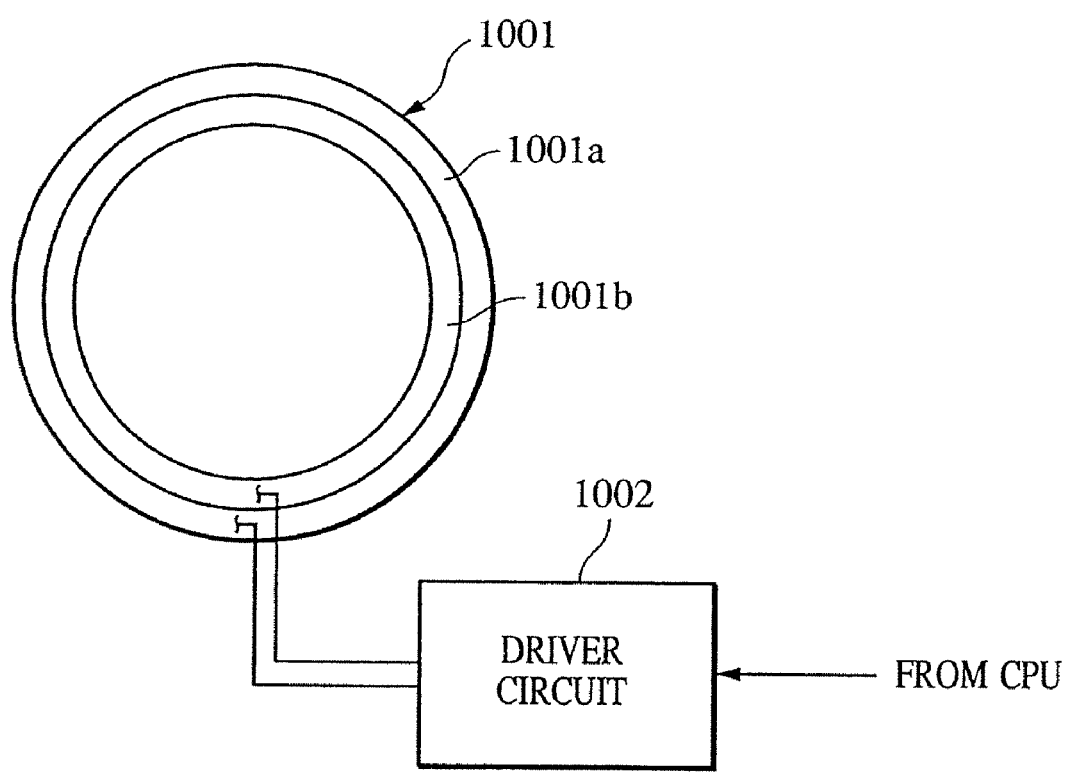
FIG. 21 is an illustration of a light-quantity control device used in a different embodiment of the present invention.

FIG. 21 is an illustration of a light-quantity control device used in an embodiment of the present invention.

Referring to this figure, the embodiment incorporates a liquid-crystal diaphragm 1001 constituted by a liquid crystal device for controlling the amount of light flux, i.e., luminous flux, passing through the optical system. The liquid-crystal diaphragm 1001 has a plurality of annular areas 1001*a* and 1001*b* which are centered at the optical axis of the optical system. The areas 1001*a* and 1001*b* are connected to a driver circuit 1002 which drives these areas 1001*a* and 1001*b* so that these areas 1001*a* and 100*b* area switched between an OFF state in which the liquid crystal transmits light rays and an ON state in which the liquid crystal blocks light rays. The driver circuit 1002 performs the ON/OFF control of the areas 1001*a* and 1001*b* in accordance with signals which are derived from a CPU of a video camera (not shown) and which indicates the shake-proofing state. The liquid-crystal diaphragm 1001 may be mounted in place of and at the same position as the diaphragm 5 of the preceding embodiments shown in FIGS. 1 and 5. The liquid-crystal diaphragm 1001 also may be mounted in place of and at the same position as the second diaphragm 820 of the preceding embodiments shown in FIGS. 11 and 18. It is still possible to employ the liquid-crystal diaphragm in a lens system other than the described zoom lens devices, e.g., in a single-focus telephoto lens system.

The liquid-crystal diaphragm 1001 shown in FIG. 21, when used in a zoom lens device, operates in a manner described below. The driver circuit 1002, upon receipt of a shake-proofing operation start signal is received from the video camera, sets the area 10011*a* and 1001*b* to the ON or OFF state in accordance with a zoom position signal given by the zoom lens device. If, for instance, the zoom signal indicates a telephoto-end focal length, the areas 1001*a* and 1001*b* are set to the ON state, whereas, when the zoom signal indicates a focal length ranging between medium and wide-angle end, the area 1001*a* is set to the ON state, while the area 1001*b* is set to the OFF state. As the liquid-crystal diaphragm 1001 is driven in the manner described, the on-axis luminous flux (light flux) reaching the central region of the image field is blocked, as in the cases of the preceding embodiments, whereby the difference in brightness between the central region and the peripheral region of the image field on the focal plane of the image pickup device can be diminished. This serves to remarkably reduce the variation in the brightness of the image field during the shake-proofing operation in which a shift lens for camera shake is actuated.

A description will now be given of a still different embodiment of the present invention, with reference to FIG. 22, which is an illustration of the light-quantity control device used in this embodiment and also to FIGS. 23A and 23B, which show light-quantity distributions.

Figure 22:
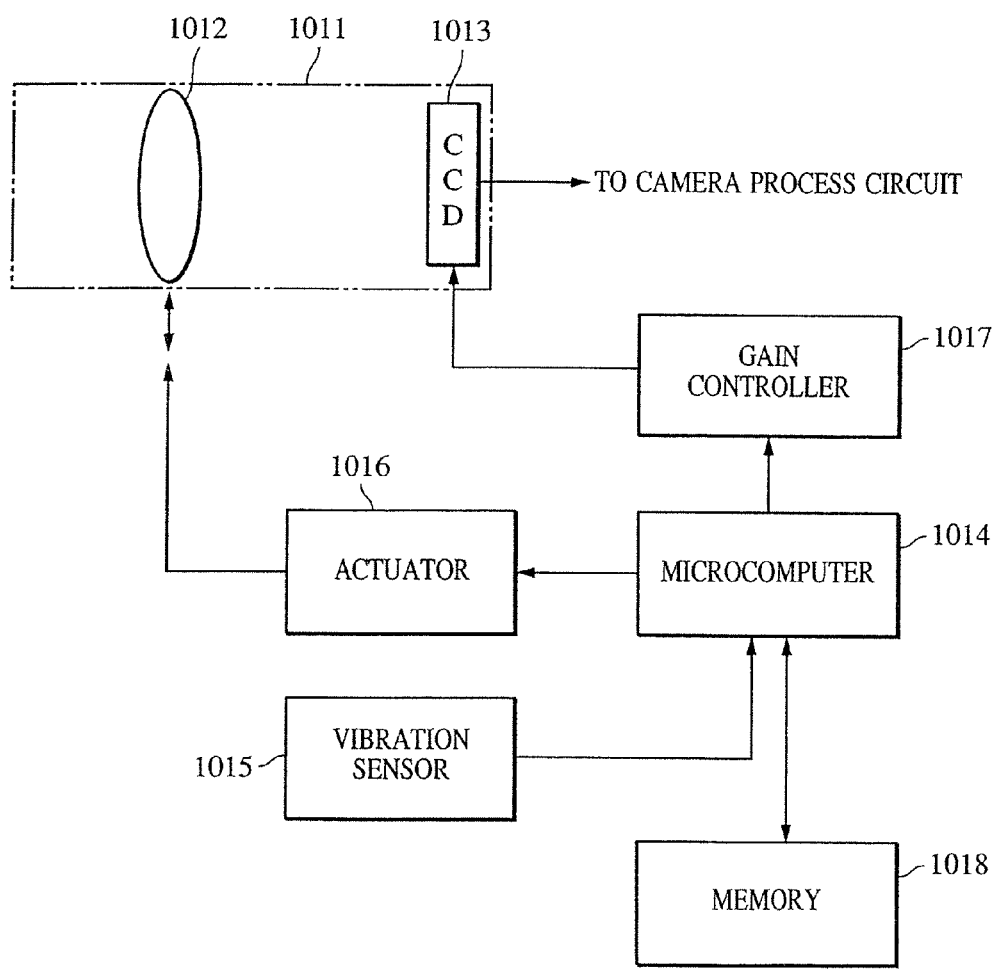
FIG. 22 is an illustration of a light-quantity control device used in a still different embodiment of the present invention.

Referring to FIG. 22, this embodiment has an image taking lens device which may be a zoom lens unit having a variable magnification lens, or single-focal telephoto lens unit. The image taking lens device 1101 has a shift lens 1012 which is shiftable to compensate for the undesirable effects caused by a camera shaking. A CCD 1013 serving as an image pickup device is disposed at the focal plane of the image taking lens 1011. Picture signals from the CCD 1013 are delivered to a camera process circuit when performs processing of the picture signals.

Referring further to FIG. 22, the embodiment has a microcomputer which is responsible for the overall control of the whole device, and a shake or shake sensor comprising, for example, a vibrating gyroscope, for sensing shaking of an image take-up device, such as a video camera, in terms of angular velocity or angle. The embodiment further has an actuator for actuating the shift lens 1012 in horizontal and vertical directions with respect to the optical axis of the image taking lens 1011. The actuator 1016 may be, for example, a voice coil motor. Numeral 1017 designates a gain controller for controlling the gain of pixel output signals on a pixel block basis: namely, for every block having a plurality of pixels of the CCD 1013. A memory 1013 stores information concerning the distribution of the light quantity that was created by the entire light flux obtained through the image taking lens 1011 and that is observed at the focal plane on the CCD 1013. The arrangement is such that information concerning the light quantity distribution on the CCD 1013, which will be obtained if the shift lens 1012 is moved to a certain position for the shake correction in response to a shake signal from the shake sensor 1015, is output from the memory 1018 to the microcomputer 1014 in relation to the level of the shake signal. The light quantity information stored in the memory 1018 will be described with reference to FIGS. 23A and 23B.

Figure 23A:
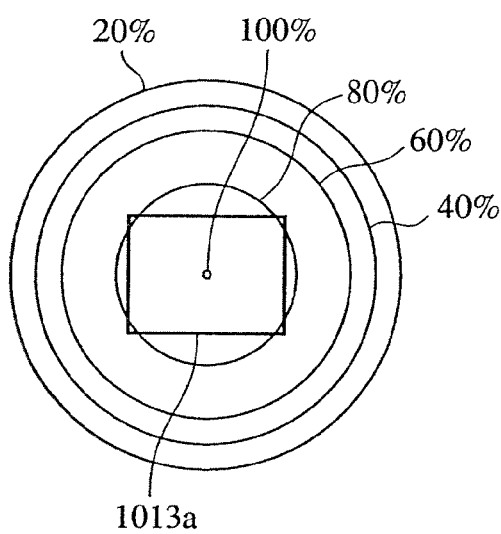
FIGS. 23A and 23B are diagrams showing light-quantity distributions.
Figure 23B:
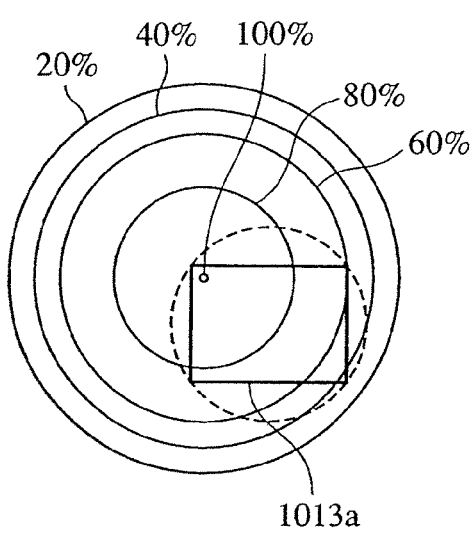

FIG. 23A shows the light quantity distribution on the focal plane of the CCD 1013 provided by the whole light flux obtained through the image taking lens 1011, in the shake correction OFF state in which the shift lens 1012 is located on the optical axis of the optical system. Representing the light quantity at the cental region around the optical axis by 100%, the light quantity is progressive decreased radially outward, as indicated by 80%, 60%, 40% and 20%. The imaging effective area 1013*a* of the CCD 1013 receives light fluxes coming through the region central region around the optical axis, so that the light quantity arranges from 80% to 100%. FIG. 23B shows the light quantity distribution as observed in the shake correction ON state in which the shaft lens 1012 of the imaging taking lens 1011 has been moved so as to effect the shaft correction in accordance with the shake signal derived from the shake sensor 1015. In this case, a light quantity distribution is created such that the light quantity received by the effective imaging area 1013*a* of the CCD 1013 progressive decreases from 100% to 40% along a line extending between the left upper corner and the right lower corner as viewed in the drawing. Information concerning this light quantity distribution developed by the light fluxes impinging upon the effective imaging area 1013*a* of the CCD 1013, obtained when the shift lens 1012 has been shifted in response to the shake signal derived from the shake sensor 1015, is stored in the memory table in relation to the level of the shake signal.

The operation of this embodiment is as follows. When the shake correction in ON, a shake signal from the shake sensor 1015 is input to the microcomputer 1014, so that the microcomputer 1014 drives the actuator 1016 in accordance with the shake signal, thereby shifting the shift lens 1012 to compensate for any undesirable effect caused by a camera shake. In the meantime, the microcomputer 1014 reads, from the memory table for the memory 1018, the information concerning the light quantity distribution on the effective imaging area 1013*a* of the CCD 1013 created when the shift lens 1012 has been shifted in response to the shake signal produced by the shake sensor 1015. Based on the light quantity distribution information read from the memory 1018, the microcomputer 1014 drives the gain controller 1017 so as to control the gains for the output signals produced by the pixels in the effective imaging area 1013*a* of the CCD 1013. For instance, if the shift lens 1012 has been shifted to the position shown in FIG. 23B, the light fluxes reaching the effective imaging area 1013*a* of the CCD 1013 create the light quantity distribution in which, as stated before, the light quantity progressively decreases from 100% to 40% along a line extending between the left upper corner and the right lower corner as viewed in the drawing. In this case, the microcomputer 1014 operates on the gains for the output signals from the pixels in the regions receiving different light quantities, such that a uniform light quantity distribution is developed over the entire effective imaging area 1013*a*. More specifically, the microcomputer 1014 drives the gain controller 1017 so as to reduce the gains for the output signals from the pixels in the regions where the light quantities are 100%, 80% and 60% so that the light quantity of 40% is obtained over the entire effective imaging area 1013*a*.

Thus, the gain controller 1017 is driven in such a manner that a uniform light quantity distribution is developed over the entire effective imaging area 1013*a* of the CCD 1013, whereby the generation of an unnatural image caused by a variation in the light quantity during a shake-proofing operation can effectively be avoided.

The embodiment shown in FIG. 22 is arranged such that the gains of the output signals from the pixels of the CCD 1013 are directly controlled by the gain controller 1017. This, however, is not exclusive and the arrangement may be such that the analog output signals from the pixels of the CCD 1013 are converted into digital picture signals and the resultant digital picture signals are rearranged in a frame memory. In this case, the gain controller effects the control operation so as to vary the gains for the digital picture signals that correspond to the pixels of the CCD 1013 and that have been arranged on the frame memory.

A description will now be given of a further different embodiment of the present invention, with specific reference to FIGS. 24 and 25, which are an illustration of a light quantity control device used in this embodiment and an illustration of a light quantity distribution, respectively. The embodiment described with reference to FIG. 22 relies upon an optical shake-proofing measure in which shake proofing is effected by mechanically shifting the shift lens. In contrast, the embodiment which will now be described with reference to FIG. 24 employs an electronic shake-proofing technique that electrically performs the shake-proofing operation.

Referring to FIG. 24, an image taking lens 1021 is an image take lens device that may be a zoom lens device having a magnification lens or a single-focus telephoto lens device. The image taking lens 1021 has a fixed image forming lens 1022. A CCD 1023 as an image pickup device is disposed at the focal plane of the image taking lens 1021. Picture signals from the CCD 1023 are delivered to a camera process circuit that performs various processing operations on the picture signals. As will be seen from FIG. 25, the CCD 1023 has a full imaging area 1023*a* carrying, for example, 680,000 pixels. The arrangement is such that the output signals from pixels in an output imaging area 1023*b* which is a regional area cut out from the full imaging area 1023*a* is constituted by, for example, 350,000 pixels.

Referring to FIG. 24, the embodiment employs a microcomputer 1024 which is responsible for the overall control of the whole apparatus, and a shake sensor 1025, which may be a vibrating gyroscope and which detects shaking of the image taking device, such as a video camera in terms of angular velocity or angle. The embodiment further includes a cut-off position designating circuit, which designates the position of the output imaging area 1023*b* to cut off the full imaging area 1023*a* of the CCD 1023. A memory 1028 stores information concerning the light distribution developed at the focal plane on the CCD 1023 by the light fluxes coming through the image taking lens 1021. The arrangement is such that the microcomputer 1024 reads from the memory 1028 the information concerning light quantity distribution on the output imaging area 1023*b* cut off the full imaging are 1023*a* of the CCD, in accordance with a shake signal produced by the shake sensor 1025.

The nature of the light quantity distribution information stored in the memory 1028 will be described in more detail with reference to FIG. 25.

This figure shows a light quantity distribution developed on the entire part of the full imaging area 1023*a* of the CCD 1023, produced by the whole light fluxes coming through the image taking lens device 1021 when the shake-proofing function is OFF. Representing the light quantity at the central region around the optical axis by 100%, the light quantity progressively decreased radially outward, as indicated by 80%, 60%, 40% and 20%. Thus, the imaging area is brightest at the central region and is darkened towards the peripheral end. When the shake-proofing function is OFF, the center of the output imaging area 1023*b* coincides with the optical axis. In this state, the output imaging area 1023*b* receives light fluxes coming along the central region around the optical axis, so that the light quantity on the output imaging area 1023*b* ranges from 80% to 100%.

Figure 25:
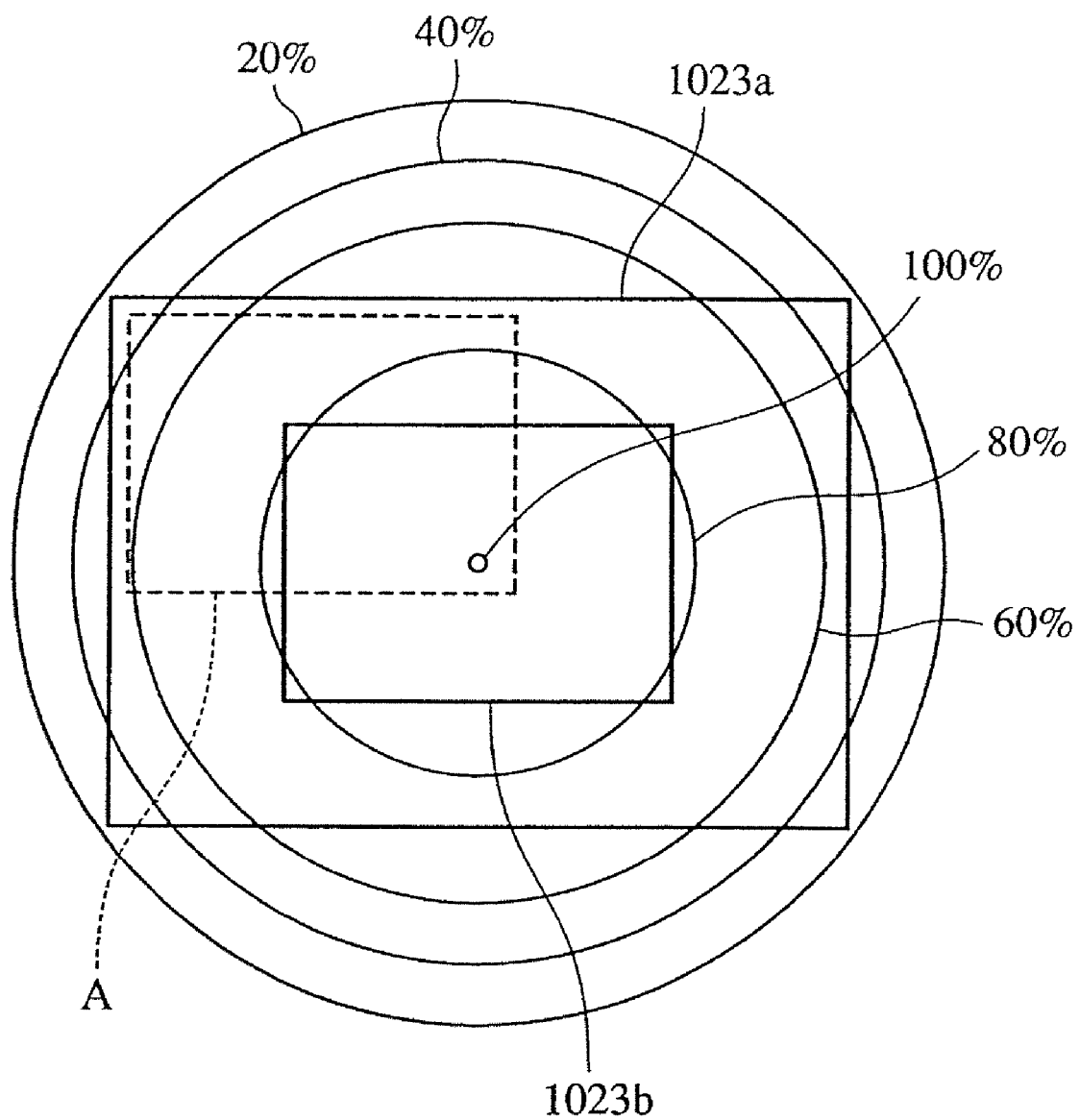
FIG. 25 is a diagram showing light-quantity distribution.

Referring to FIG. 25, the position of the output imaging area 1023*b* cut off the full imaging area 1023*a* of the CCD 1023 has been shifted to a position "A" indicated by a broken line in accordance with a shake signal derived from the shake sensor 1025, so as to effect the shake correction. In this state, the light fluxes impinging upon the output imaging area 1023*b* provide a light quantity distribution such that the light quantity progressively decreases from 100% to 40% along a diagonal line extending between the left upper corner to the right lower corner of the area 1023*a* as viewed in the figure. Information concerning this light quantity distribution created on the shifted output imaging area 1023*b* is stored in the memory table in relation to the shake signal which is derived from the shake sensor 1025 and which corresponds to this light quantity distribution.

In operation, when the shake correction function is ON, the shake signal from the shake sensor 1025 is input to the microcomputer 1024. The microcomputer 1024 operates to vary the position on the full imaging area 1023*a* at which the output imaging area 1023*b* is to be cut off the full imaging area 1023, in accordance with the shake signal received from the shake sensor 1025, whereby a shake correction is performed to compensate for the undesirable effects produced by camera shaking.

The microcomputer also reads, from the memory table of the memory 1028, the information concerning the distribution of the light quantity created by the light fluxes impinging upon the output imaging area 1023*b* that has been shifted in accordance with the shake signal. The microcomputer 1024 then drives the gain controller 1027 so as to control, based on the light quantity distribution information read from the memory 1028, the gains for the output signals from the pixels contained in the output imaging area 1023*b* of the CCD 1023.

For instance, if the cut-off position, i.e., the position of the output imaging area 1023*b*, has been shifted to the position "A" indicated by the broken line in FIG. 25, the light quantity distribution created by the light fluxes reaching the shifted output imaging area 1023*b* progressively decreases from 100% to 40% along the diagonal line starting from the left upper corner and terminating at the right lower corner. In this case, the microcomputer 1024 drives the gain controller so that gains are suitably reduced for the output signals from the pixels in the regions where the light quantities are 100%, 80% and 60%, such that a uniform light quantity of 40% is developed over the entirety of the output imaging are 1023*b*.

Thus, in this embodiment, the gain controller 1027 is activated in accordance with the shake signal, so as to achieve a uniform light quantity distribution over the output imaging area 1023*b* cut off the full imaging area 1023*a* of the CCD 1023. It is therefore possible to avoid generation of an unnatural image attributable to a variation in the light quantity distribution which occurs during the shake-proofing operation.

The embodiment shown in FIG. 24 is arranged such that the gains of the output signals from the pixels of the CCD 1023 are directly controlled by the gain controller 1027. This, however, is not exclusive and the arrangement may be such that the analog output signals from the pixels of the CCD 1023 are converted into digital picture signals and the resultant digital picture signals are rearranged in a frame memory. In this case, the gain controller effects the control operation so as to vary the gains for the digital picture signals which correspond to the pixels of the CCD 1023 and which have been arranged on the frame memory. The light quantity distribution on the full imaging area 1023*a* of the CCD 1023 provided by the light fluxes coming through the image taking lens 1021 is not changed regardless of whether the shake-proofing function is ON or OFF. Therefore, the embodiment described with reference to FIG. 24 may be modified such that, when the shake-proofing function is ON, the gain controller 1027 performs a gain control for all the pixels of the full imaging area 1023a so as to realize an equal light quantity, e.g., 40%, over the entire full imaging area 1023a.

The invention claimed is:

1. An optical apparatus having an image taking lens comprising:
   a shake sensor for detecting shake in said optical apparatus and outputting a shake signal in accordance with the shake;
   a shake correcting lens disposed in said image taking lens and moving in a direction perpendicular to an optical axis of said image taking lens in accordance with the shake signal in order to correct the shake of the image;
   an image pickup device that is disposed on an imaging plane of said image taking lens, has an imaging area for converting an optical image generated by said image taking lens into an electrical signal, and outputs the electrical signal from the imaging area as a picture signal; and
   controlling means for varying a correction amount of light quantity among a plurality of pixels in the imaging area such that a light quantity of the whole imaging area becomes a uniform light quantity distribution in a state in which the shake of the image is being corrected, and for not varying the correction amount in a state in which the shake of the image is not being corrected.

2. An optical apparatus having an image taking lens comprising:
   a shake sensor for detecting shake in said optical apparatus and outputting a shake signal in accordance with the shake;
   a shake correcting lens disposed in said image taking lens and moving in a direction perpendicular to an optical axis of said image taking lens in accordance with the shake signal in order to correct the shake of the image;
   an image pickup device that is disposed on an imaging plane of said image taking lens, has an imaging area for converting an optical image generated by said image taking lens into an electrical signal, and outputs the electrical signal from the imaging area as a picture signal; and
   controlling means for varying a correction amount of light quantity among a plurality of pixels in the imaging area such that a light quantity of the whole imaging area becomes a uniform light quantity distribution when the shake of the image is being corrected,
   wherein said controlling means varies gains among a plurality of pixels in the imaging area of said image pickup device.

3. An optical apparatus having an image taking lens comprising:
   a shake sensor for detecting shake in said optical apparatus and outputting a shake signal in accordance with the shake;
   a shake correcting lens disposed in said image taking lens and moving in a direction perpendicular to an optical axis of said image taking lens in accordance with the shake signal in order to correct the shake of the image;
   an image pickup device that is disposed on an imaging plane of said image taking lens, has an imaging area for converting an optical image generated by said image taking lens into an electrical signal, and outputs the electrical signal from the imaging area as a picture signal;
   controlling means for varying a correction amount of light quantity among a plurality of pixels in the imaging area such that a light quantity of the whole imaging area becomes a uniform light quantity distribution when the shake of the image is being corrected; and
   a frame memory for taking in a picture signal output from each pixel in the imaging area,
   wherein said controlling means varies gains output from the pixel in the imaging area of said image pickup device and taken in by said frame memory.

4. An optical apparatus having an image taking lens comprising:
   an image pickup device that is disposed on an imaging plane of said image taking lens, has an imaging area larger than an output imaging area for converting an optical image generated by said image taking lens into an electrical signal, and outputs the electrical signal from the output imaging area as a picture signal;
   a shake sensor for detecting a shake of said optical apparatus and outputting a shake signal in accordance with the shake;
   shake correcting means for moving the output imaging area read out from the imaging area in accordance with the shake signal and correcting the shake of an image; and
   controlling means for varying a correction amount of light quantity among a plurality of pixels in the output imaging area such that a light quantity of the whole output imaging area becomes a uniform light quantity distribution in a state in which the shake of the image is being corrected by said shake correcting means, and for not varying the correction amount in a state in which the shake of the image is not being corrected by said shake correcting means.

5. An optical apparatus having an image taking lens comprising:
   an image pickup device that is disposed on an imaging plane of said image taking lens, has an imaging area larger than an output imaging area for converting an optical image generated by said image taking lens into an electrical signal, and outputs the electrical signal from the output imaging area as a picture signal;
   a shake sensor for detecting a shake of said optical apparatus and outputting a shake signal in accordance with the shake;
   shake correcting means for moving the output imaging area read out from the imaging area in accordance with the shake signal and correcting the shake of an image; and
   controlling means for varying a correction amount of light quantity among a plurality of pixels in the output imaging area such that a light quantity of the whole output imaging area becomes a uniform light quantity distribution when the shake of the image is being corrected by said shake correcting means,
   wherein said controlling means varies gains among a plurality of pixels in the output imaging area of said image pickup device.

6. An optical apparatus having an image taking lens comprising:
   an image pickup device that is disposed on an imaging plane of said image taking lens, has an imaging area larger than an output imaging area for converting an optical image generated by said image taking lens into an electrical signal, and outputs the electrical signal from the output imaging area as a picture signal;

a shake sensor for detecting a shake of said optical apparatus and outputting a shake signal in accordance with the shake;

shake correcting means for moving the output imaging area read out from the imaging area in accordance with the shake signal and correcting the shake of an image;

controlling means for varying a correction amount of light quantity among a plurality of pixels in the output imaging area such that a light quantity of the whole output imaging area becomes a uniform light quantity distribution when the shake of the image is being corrected by said shake correcting means; and a frame memory for taking in a picture signal output from each pixel in the output imaging area, wherein said controlling means varies gains of the picture signal output from each pixel in the output imaging area of said image pickup device and taken in by said frame memory.

* * * * *